(12) United States Patent
Pavlidis et al.

(10) Patent No.: US 7,149,325 B2
(45) Date of Patent: Dec. 12, 2006

(54) COOPERATIVE CAMERA NETWORK

(75) Inventors: Ioannis Pavlidis, Minneapolis, MN (US); Vassilios Morellas, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 686 days.

(21) Appl. No.: 10/177,688

(22) Filed: Jun. 21, 2002

(65) Prior Publication Data
US 2003/0040815 A1 Feb. 27, 2003

Related U.S. Application Data

(63) Continuation-in-part of application No. 10/123,985, filed on Apr. 17, 2002, now abandoned.

(60) Provisional application No. 60/284,863, filed on Apr. 19, 2001.

(51) Int. Cl.
*G06K 9/00* (2006.01)

(52) U.S. Cl. ............... 382/103; 382/165; 382/170; 382/270

(58) Field of Classification Search ............... 382/103, 382/165, 170, 270; 348/154
See application file for complete search history.

(56) References Cited

U.S. PATENT DOCUMENTS

| 5,363,297 | A | 11/1994 | Larson et al. | |
|---|---|---|---|---|
| 5,892,554 | A | 4/1999 | DiCicco et al. | |
| 6,292,575 | B1* | 9/2001 | Bortolussi et al. | 382/118 |
| 6,351,556 | B1* | 2/2002 | Loui et al. | 382/164 |
| 6,424,370 | B1* | 7/2002 | Courtney | 348/143 |
| 6,639,998 | B1* | 10/2003 | Lee et al. | 382/103 |
| 6,678,413 | B1* | 1/2004 | Liang et al. | 382/181 |

FOREIGN PATENT DOCUMENTS

WO   WO 00/73995   12/2000

* cited by examiner

*Primary Examiner*—Phuoc Tran
(74) *Attorney, Agent, or Firm*—Kris T. Fredrick

(57) ABSTRACT

A cooperative camera network involving segmenting an image of an object and extracting a color signature from it. The color signature may be matched with the other signatures in an attempt to identify the object. There also can be combining and fusing the tracking of people and objects with image processing and the identification of the people and objects being tracked in an area or facility.

16 Claims, 18 Drawing Sheets

| Hypothesis | $z_1(1)$ | $z_2(1)$ | $z_1(2)$ | Track No. |
|---|---|---|---|---|
| $H_1$ | 0 | 0 | - | 0 |
| $H_2$ | 1 | 0 | - | 1 |
| $H_3$ | 0 | 2 | - | 2 |
| $H_4$ | 1 | 2 | - | 1,2 |
| $H_5$ | 1 | 0 | 3(1) | 3 |
| $H_6$ | 1 | 2 | 3(1) | 2,3 |
| $H_7$ | 0 | 2 | 4(2) | 4 |
| $H_8$ | 1 | 2 | 4(2) | 1,4 |
| $H_9$ | 0 | 0 | 5 | 5 |
| $H_{10}$ | 1 | 0 | 5 | 1,5 |
| $H_{11}$ | 0 | 2 | 5 | 2,5 |
| $H_{12}$ | 1 | 2 | 5 | 1,2,5 |

COOPERATIVE CAMERA NETWORK

This application claims the benefit of and is a continuation-in-part of U.S. Nonprovisional application Ser. No. 10/123,985, filed Apr. 17, 2002, abandoned. Also, this application claims the benefit of U.S. Provisional Application No. 60/284,863, entitled "Method and Apparatus for Tracking People", filed Apr. 19, 2001, wherein such document is incorporated herein by reference.

BACKGROUND

The invention pertains to surveillance systems. In particular, it pertains to identifying and monitoring someone throughout a building or structure.

Other applications relating to similar technology include U.S. patent application Ser. No. 10/034,696, filed Dec. 27, 2001, and entitled, "Surveillance System and Methods Regarding Same", which is incorporated herein by reference; U.S. patent application Ser. No. 10/034,780, filed Dec. 27, 2001 and entitled "Method for Monitoring a Moving Object and System Regarding Same", which is incorporated herein by reference; and U.S. patent application Ser. No. 10/034,761, filed Dec. 27, 2001 and entitled "Moving Object Assessment System and Method", which is incorporated herein by reference.

SUMMARY

The invention involves segmenting an image of an object and extracting a color signature from it. The color signature may be matched with other signatures in a database in an attempt to identify the object. There are many configurations and variants of this invention not disclosed here. An illustrative example is provided below.

DESCRIPTION

Figure 1:
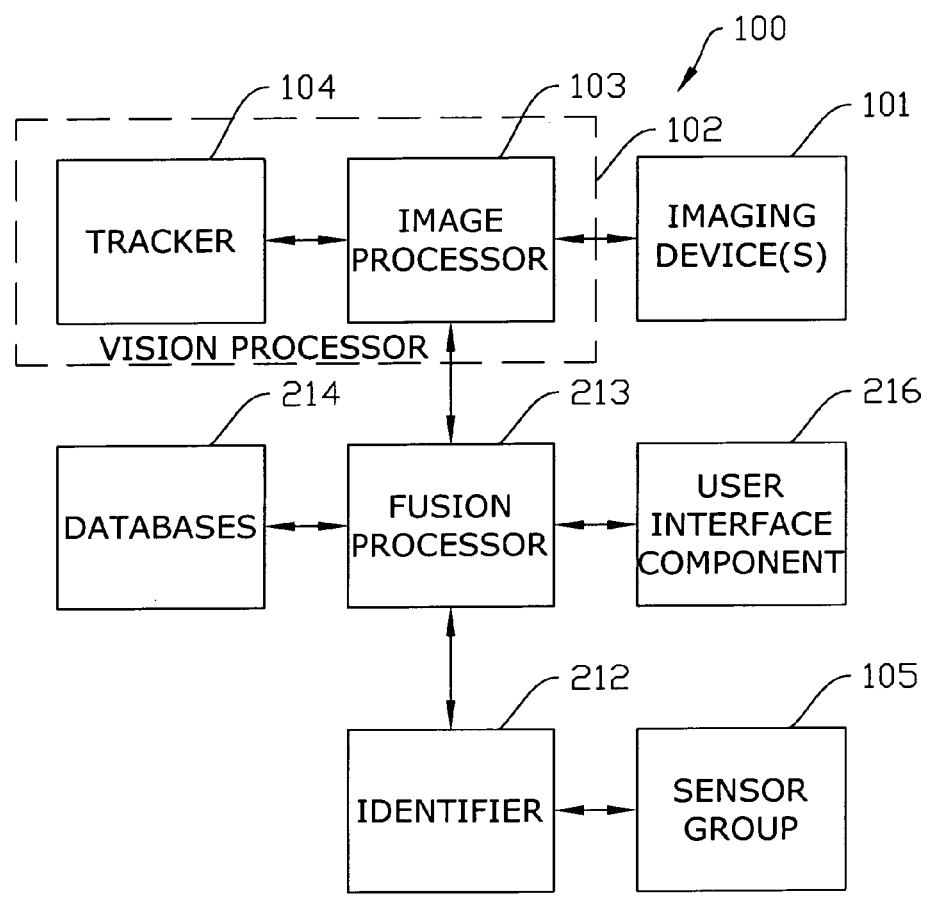
FIG. 1 is a diagram of a people and object tracker system.

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Technologies and methods may be combined into a single integrated approach to track people or objects. It is particularly useful for tracking employees in relatively large settings, for examples, refineries and factories. The primary technology for tracking is cameras, imaging devices or visual sensors and image processing. The partnering technology involves identifying mechanisms such as specialty readers and/or sensors used for positive identification of people and objects. Positive identification of people would be made at choke points of paths of movement of the people, or at appropriate check points. Fusion of the primary and partnering technologies results in a powerful technology for tracking objects or people, such as workers in a plant or another area. This fusion or combination of the mentioned technologies is one aspect an application.

Further application of this technology can be obtained by imbedding fused camera and positive technology into a mapping system. This system provides for easy access or visualization of information, as well as transformation of the information into a context of spatial coordinates or other forms. One instance is imbedding the fused camera and positive identification information into a global information system (GIS) mapping system to show the location of a tracked person in relation to certain equipment in a database of a factory or refinery, or in relation to a process location on a process diagram of the factory or refinery. Because a process diagram may not correspond directly to geographic or physical space in the field, the geographic or physical location of a tracked person may have to be translated or mapped to the corresponding space in the process diagram. This feature can be added to the base technology, which is the combined/fused image processing and specific identification technologies, or any variation of the base technology along with other technologies or features as desired.

In tracking an employee, additional information can be developed about the condition of an employee or the plant that the employee is at. Such information may improve the capability of the present system to track employees effectively and to most efficiently direct employee efforts in the plant for a known set of conditions in the plant. For example, specialized detection capabilities in the viewing camera and the video processing system may detect whether the employee has stopped moving, thus implying possible incapacitation of, or injury to the employee. This information would allow the system to conclude that there may be a problem with the employee and thus alert an operator to investigate the situation of the employee. Special video detection capabilities can be utilized to monitor the condition of the plant or installation in a manner that provides for a more thorough diagnosis of the plant's condition.

FIG. 1 is a diagram of an embodiment of a people or object tracker 100. The tracking of, for example, people is used here for illustrating an application of the technology. An area or facility may be observed with multiple cameras or imaging devices 101 situated throughout, for instance, the facility. The images from the cameras or imaging devices 101 are fed electronically in digital or analog format into an image processing component 102 that includes tracking capability of people or objects detected by the cameras 101. The path or track of an object or person being tracked is noted. The image processing of component 102 is to maintain continuity of the tracking even if no cameras 101 have field-of-view overlaps with one another. Tracking may also include observation of immobile objects. One example would be the observation of a valve or pipeline by a specially designed IR camera 215 that could provide an image indicating frost or ice on the valve or pipeline thereby indicating a possible problem.

Figure 2:
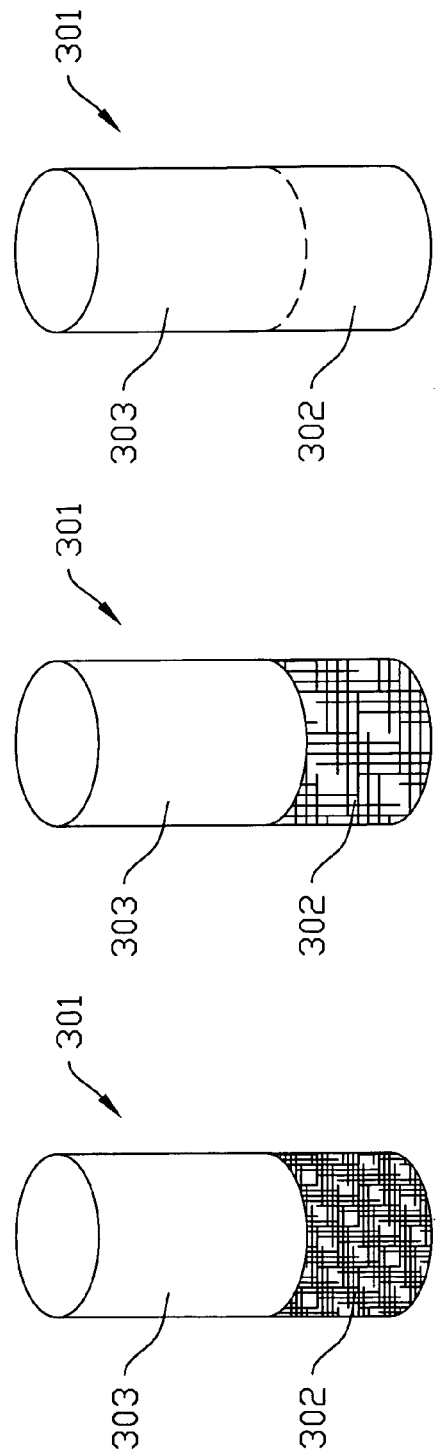
FIGS. 2a, 2b and 2c reveal infrared detection of ice on an object.

The particular properties of water have been established in the upper near-infrared spectrum (i.e., 0.4 µm to 2.4 µm). Water and objects bearing water have very low reflectivity and thus essentially are black bodies in this spectrum. This black body characteristic is noticeable in an image when the water is above a virtual mass. A light cover of rainwater will not reveal this characteristic. However, a cover of ice (i.e., concentrated water) or a human body (i.e., thick water-based mass) will have such black body characteristic. FIG. 2a shows a metal cylinder 301 having an iced lower portion 302 which appears as a black body. FIG. 2b shows the cylinder midway in de-icing. Black area 302 has started shrinking. The lower portion 302 of cylinder 301 is completely de-iced and appears the same as upper part 303 in FIG. 2c. A pseudo-coloring algorithm can be used to present in different colors the different states of ice coverage. Using the different colors, an operator is given an idea how thick the ice is and he or she is dynamically updated as to the progress of the de-icing operation. Also, the algorithm will determine if the level of illumination is sufficient for such ice detection.

Figure 3:
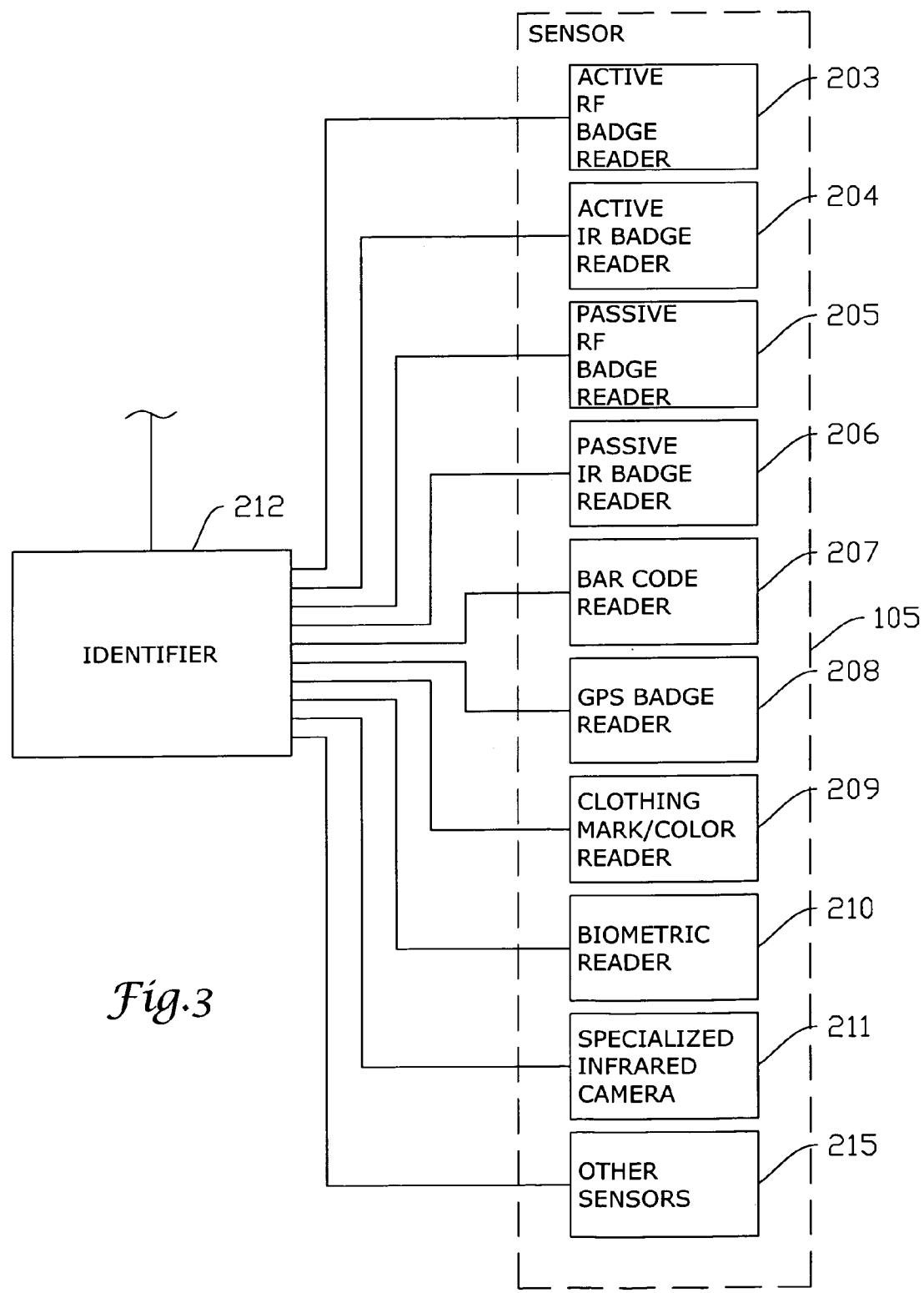
FIG. 3 shows various sensors and their connection to the identifier.

For positively identifying the objects or people being tracked, one or more of a group 105 of sensors may be utilized. This group of sensors includes active RF badge readers 203, active IR badge readers 204, passive RF badge readers 205, passive RF badge readers 206, long or short range bar code readers 207, GPS badge readers 208, identifying clothing marker readers 209 such as colors, shapes and numbers on the clothing, biometric readers 210 (e.g., fingerprint or retina), specialized IR cameras 211 and other sensors 215. The sensors' 105 connection to identifier 212 is shown in FIG. 3. These are just examples of identification sensors which may be used. Such sensors would be placed in area on a grid-like layout or at choke points, gates, security check points, entry points, narrow lanes of travel, and so on. Outputs of these sensors 105 go to an input of a positive identifying component 212.

The output from positive identifying component 212, which is a synthesis of the inputs from the various sensors or sensor indicating a positive identification of the object or person being tracked, goes to fusion component 213. Other inputs to component 213 come from vision processor component 102 and a database component 214. Database component 214 is a source of information for fusion component 213. Fusion component may send out signals to component 213 requesting certain information about certain objects or persons being tracked. For instance, work order systems may be a source of valuable information useful in the tracking of a worker in a factory or refinery. Database component 214 is a source of many types of information in numerous databases.

The output of the fusion component 213 goes to a user interface component 216. Component 216 typically would have interface electronics 234, and a screen 218 with a display 225 in FIG. 5 showing the object or person being tracked and, whenever possible, a positive identification of the tracked person or object.

Figure 4:
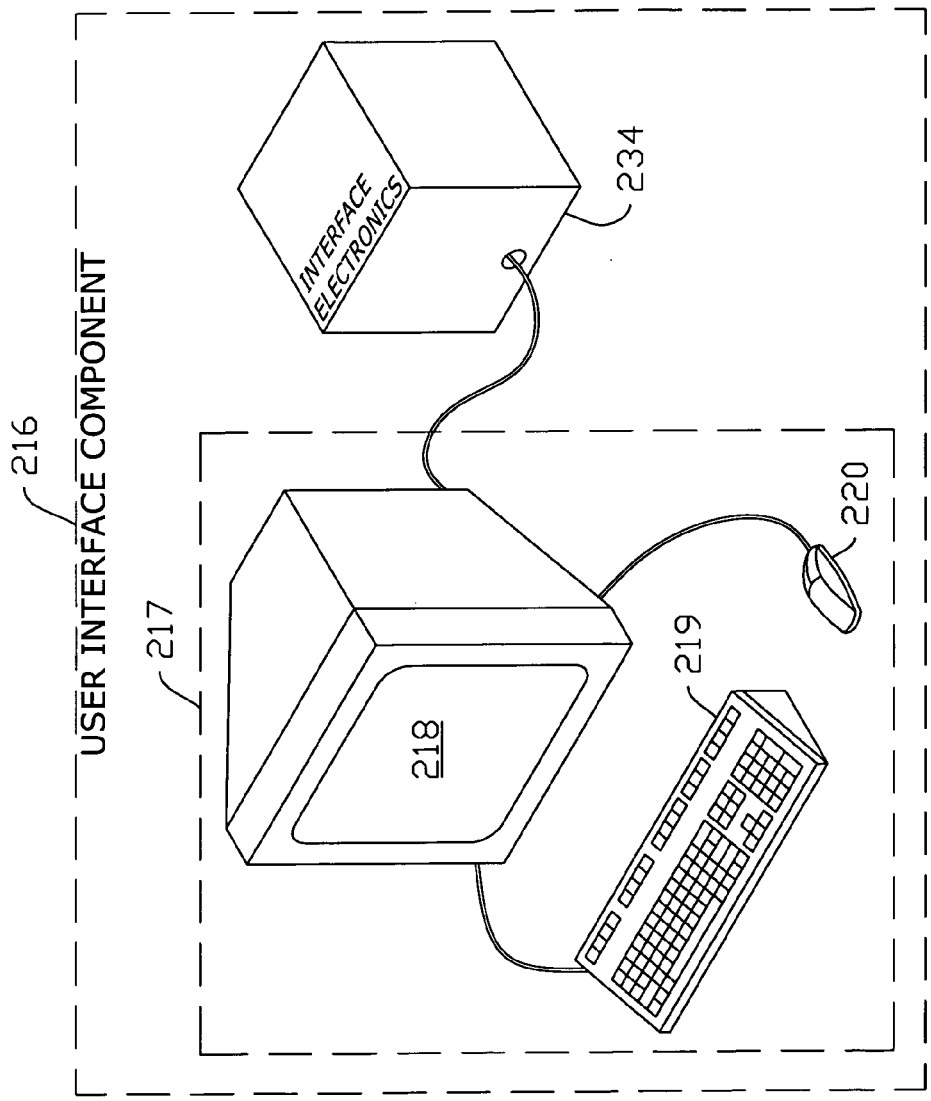
FIG. 4 illustrates a user interface component with a monitor, keyboard, mouse and electronics module.
Figure 5:
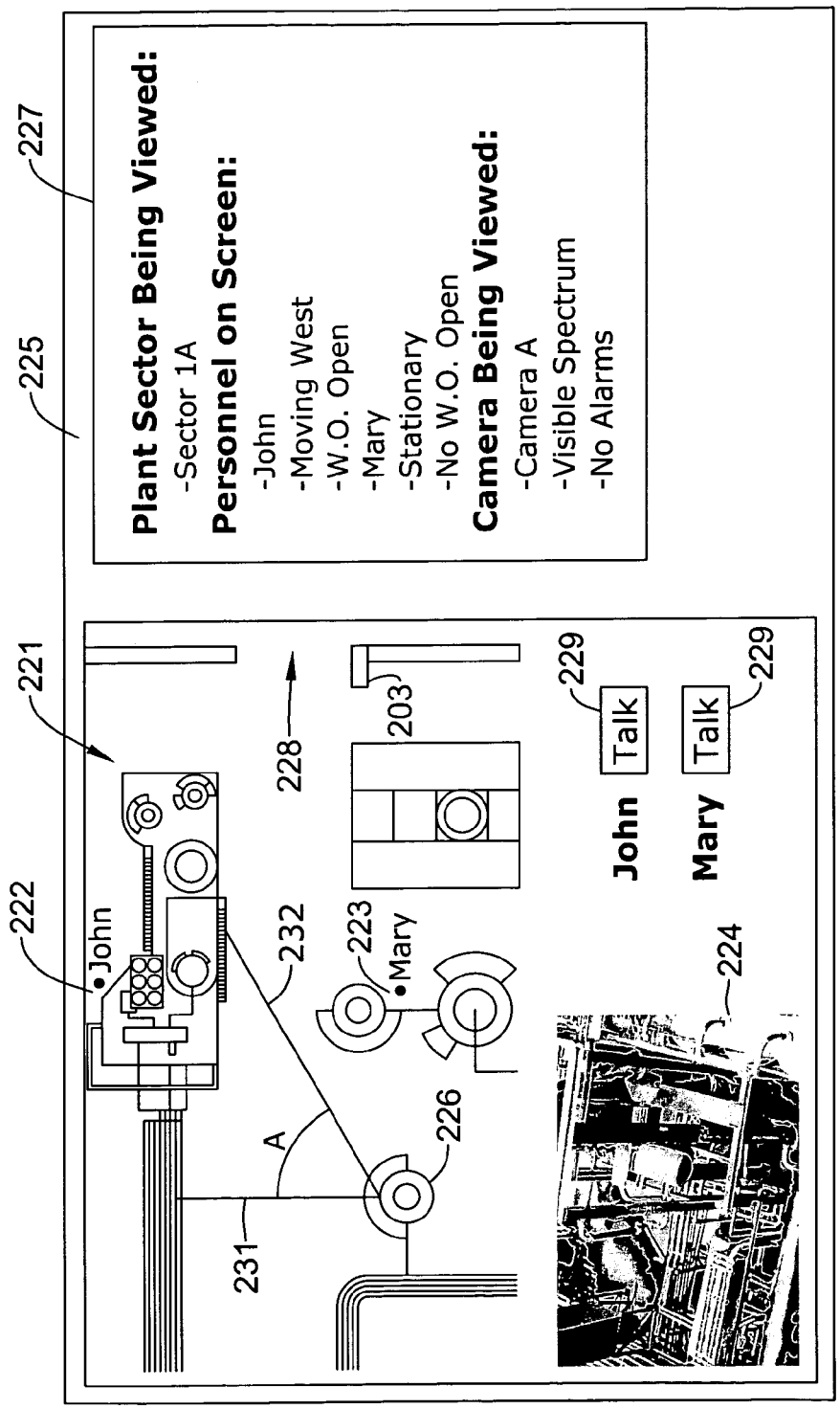
FIG. 5 shows an illustrative example display of tracking and identification in a work facility.

An example of an application of the fused camera tracking and positive identification of system 100 is illustrated in FIG. 5. One component of user interfaces 216 is a monitor 217 having a display screen 218, a keyboard 219 and a mouse 220, as shown in FIG. 4. FIG. 5 is displayed on an operator screen 218. FIG. 5 is a display 225. A plan view 221 of an industrial installation is shown. Employees John 222 and Mary 223 are shown on the plan view. Photo 224 shows the area where employees 222 and 223 are known to be located. On the right of display 225 of screen 218 is an information section 227 about the plant area being viewed, the employees shown, and a camera 226 of imaging device(s) 101 used. Sector 1A of the plant is being viewed by camera A (i.e., camera 226). John 222 is moving West with an open W.O. (i.e., work order). Mary 223 is stationary with no W.O. open. There are no alarms on. Camera 226 and image processing 103 are tracker 104 enable visual tracking of employees 222 and 223. The other components used are a sensor from sensor group 105 and identifier 212. These components provide positive identification of employees 222 and 223. For instance, radio frequency (RF) identification (ID) tags are worn by employees 222 and 223. These employees are positively identified by an RF tag or badge reader 203 or 205 at a selected choke point (e.g., entrance 228) in the plant or other convenient location. Besides RF ID tags, other items may be used for positive identification of an employee tracked by system 100. Such items could include IR tags, badge swiping, and fingerprint, palm, retinal or face scanning. Also included could be visual detection of badges or clothing with unique colors or shapes, bar code scanning (e.g., with a bar code located on the person's badge or clothing), or any other method or technology available for identification.

Plan view 221 of the area monitored by camera A 226, shows employees 222 and 223 to be present in the area and at their respective locations. John 222 and Mary 223 were positively identified by a reader when walking through a choke point or entrance 228 when entering the area, and were tracked to their current locations by vision processor 102. An RF reader 203 sent additional information about employees 222 and 223 to identifier 212. Identifier 212 processed and forwarded this information to vision processor 102, when employees 222 and 223 were detected by reader 203 at choke point 228. If communication is desired with John or Mary, an intercom "Talk" button 229 proximate to John or Mary's name on screen 225 may be activated with a touch of the respective button.

Additional video technologies may be used to improve tracking and identification of a person or object. One such technology is cooperative camera networks (CCN). CCN can detect change in a scene viewed by a camera. Such change is detected with the use of frame differencing and adaptive thresholding. Frames of a video are compared to detect differences between a current frame and a reference or initialization frame. The parts of the current frame that differ from the reference frame are extracted and a histogram is done of the pixels of those extracted parts. A threshold level is assigned to the histogram that provides for a division between what is actually change and what is noise. CCN can be used, for example, to evaluate the composite color of a person's clothes so as to help identify and track such person.

Figure 6:
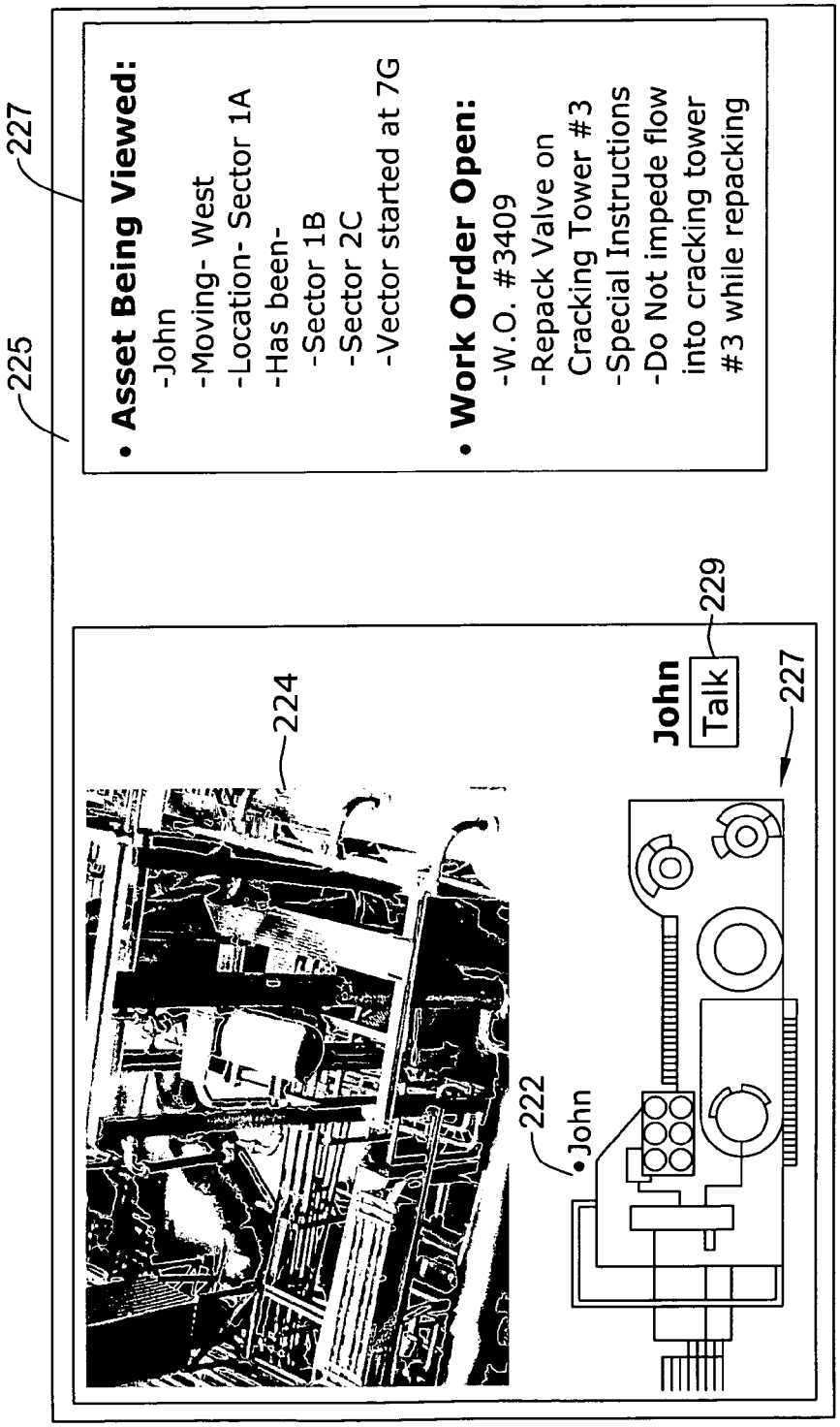
FIG. 6 is similar to FIG. 5 but having a focus on one of the workers with more detailed information.

FIG. 6 shows additional information being integrated with the video tracking and positive identification information. Additional information inputs may include, for example, in a factory or refinery setting, information about a particular machine's performance, information about work orders that are open and held by a worker shown on display 225, information about potential or evolving abnormal situations in the industrial processes, information about a repair process that is about to be undertaken by a worker, or other types of information. An example of such information shown in information section 227 of display 225 of FIG. 6, which is on screen 218 of monitor 217. Work order information, work detail, special instructions and other information are accessed by tracking system 100 from database(s) 214. Additional capabilities added to display 225 increase the overall power and effectiveness of system 100. The lower part of display 225 shows the relevant portion of plan view 227.

Figure 7:
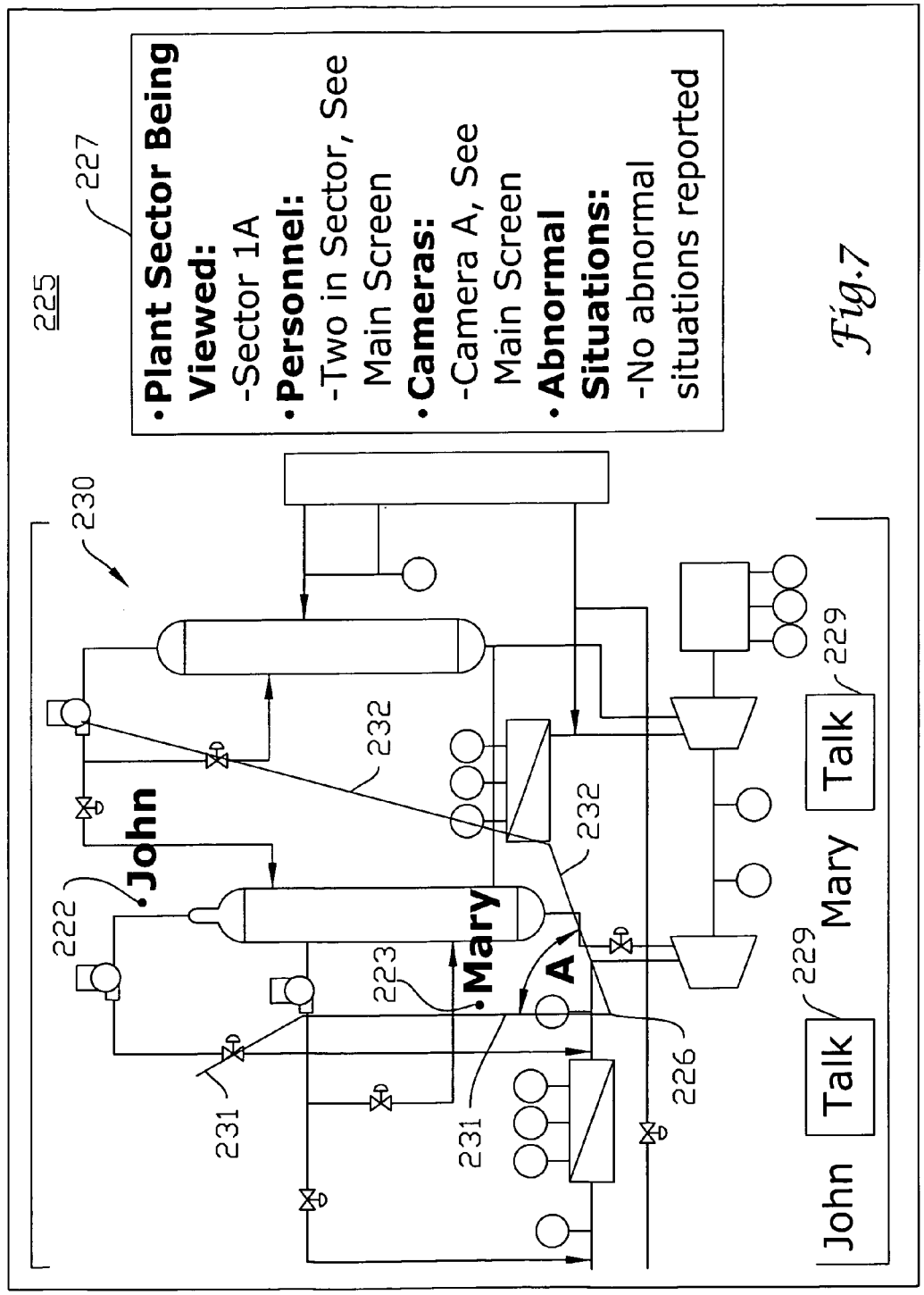
FIG. 7 shows worker locations relative to a process diagram of a work facility.

The above-mentioned GIS can also improve the ability of tracking system 100. GIS can locate and translate spatial information by implementing a fine measuring grid. The area around each intersection on the grid may be designated area of influence for that intersection. The area of influence may be correlated to the portions of a map that are not directly spatially related to the plant, factory or refinery, such as a process diagram 230 as shown in FIG. 7. Diagram 230 is an example of mapping where GIS is used to correlate spatial information to non-spatial formats. Process diagram 230 shows John 222 and Mary 223 being located near the process or process equipment that they are standing near in the plant. Field-of-view lines of camera A 226 are bent because the camera field of view is distorted as it is translated from plan view 221 of FIG. 5 into process diagram 230 of FIG. 7.

Figure 8:
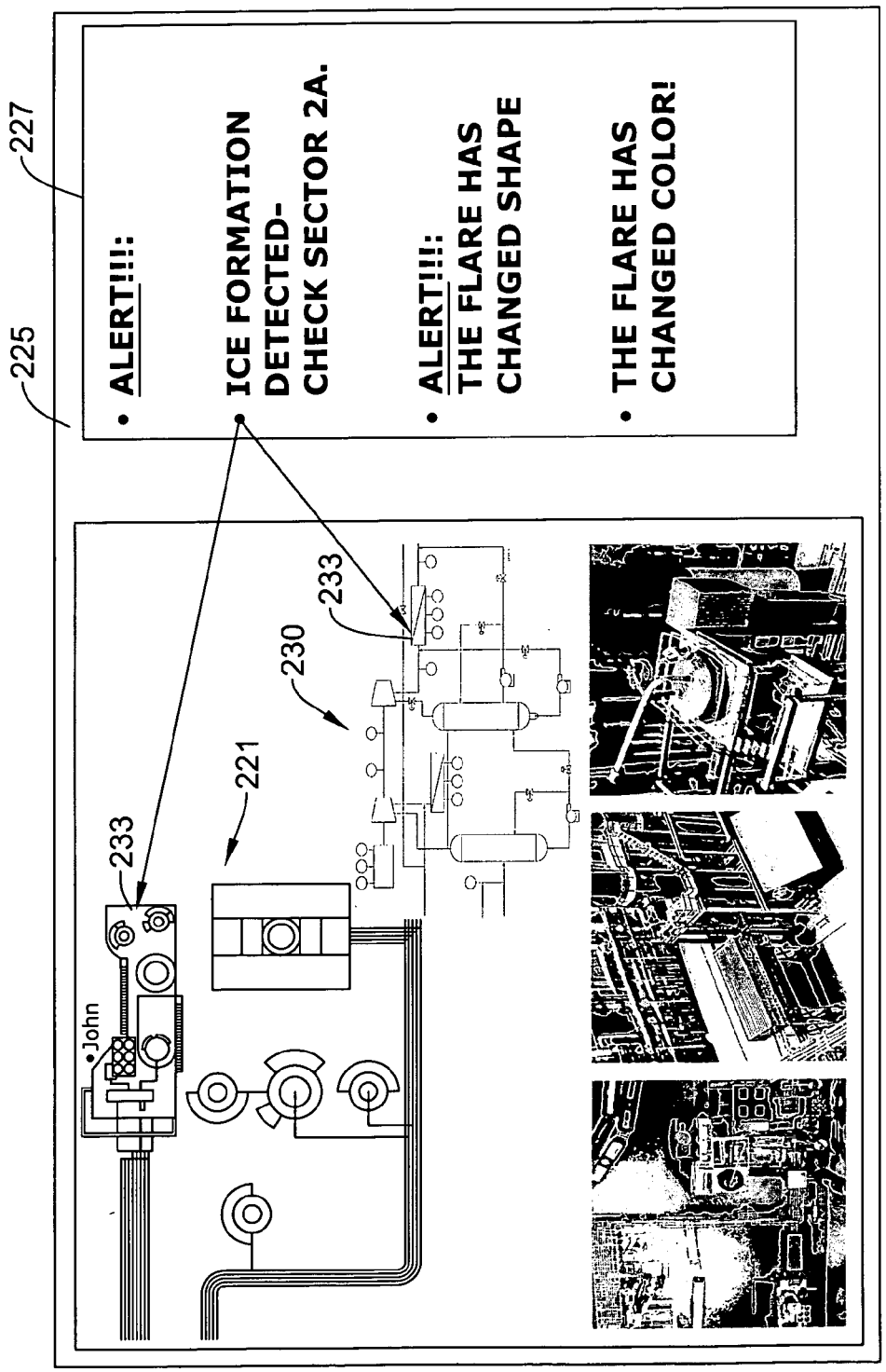
FIG. 8 reveals a correlation between a plan view and process diagram of the work facility, with alarm status information.

Special video detection features add to the diagnostic capabilities of system 100, thereby increasing its power and effectiveness. FIG. 8 illustrates some detection features that may be particularly useful for oil refineries. For instance, ice may coat some pipes and valves in an oil refinery which can prevent valves 233 from operating properly. Improper operation of these valves 233 can lead to serious functional problems in the refinery. Ice detection capabilities can be added as a feature (i.e., ice detection based on near infrared phenomenology) as illustrated in FIGS. 2a, 2b and 2c. Other features can include capabilities used for flare (flame) detection, including detecting changes in the color and/or shape of the flare. An ultra violet light detector may be used to monitor a flame. Information section 227 provides examples of alert notices of ice formation and location and of flare change which may indicate the change of quality and quantity of the flames constituting the flare.

GIS can be a resource in database component 214. GIS may be used to assist in objectively describing the actual location of a person based on maps processed by image processing component 102. Further information from such a system could provide the location of a person or object tracked relative to a process flow layout, such as one of a refinery.

Image processing component 102 consists of processing for multicamera surveillance and object or person tracking. Component 102 has a moving object segmentor, a tracker and a multi-camera fusion module. One object detection method is based on a mixture of Normal representation at the pixel level. Each normal reflects the expectation that samples of the same scene point are likely to display Gaussian noise distributions. The mixture of Normals reflects the expectation that more than one process may be observed over time. The method used here is similar in that a multi-Normal representation is used at the pixel level. But that is the extent of the similarity. The present method uses an Expectation-Maximization (EM) algorithm to initialize models. The EM algorithm provides strong initial statistical support that facilitates fast convergence and stable performance of the segmentation operation. The Jeffreys (J) divergence measure is used as the measuring criterion between Normals of incoming pixels and existing model Normals. When a match is found, the model update is performed using a method of moments. When a match is not found, the update is performed in a way that guarantees the inclusion of the incoming distribution in the foreground set.

The method just described permits the identifying foreground pixels in each new frame while updating the description of each pixel's mixture model. The identified and labeled foreground pixels can then be assembled into objects using a connected components algorithm. Establishing a correspondence of objects between frames (i.e., tracking) is accomplished by using a linearly predictive multiple hypotheses tracking algorithm which incorporates both position and size. The object tracking method is described below.

Although overlapping or fusion of fields of view (FOV) are not required for the image processing with tracking component 102, fusion of FOV's is discussed here. Fusion is useful since no single camera can cover large open spaces in their entirety. FOV's of various cameras may be fused into a coherent super picture to maintain global awareness. Multiple cameras are fused (calibrated) by computing the respective homography matrices. The computation is based on the identification of several landmark points in the common FOV between camera pairs. The landmark points are physically marked on the scene and sampled through the user interface. The achieved calibration is very accurate.

The present FOV fusion system has a warping algorithm to accurately depict transformed views. This algorithm computes a near optimal camera configuration scheme since the cameras are often far apart and have optical axes that form angles which vary quite much. Resulting homographies produce substantially skewed frames where standard warping fails but the present warping succeeds.

Object or person tracking by image processing component can substantively begin with an initialization phase. The goal of this phase is to provide statistically valid values for the pixels corresponding to the scene. These values are then used as starting points for the dynamic process of foreground and background awareness. Initialization needs to occur only once. There are no stringent real-time processing requirements for this phase. A certain number of frames N (N=70) are accumulated and then processed off-line.

Each pixel x of an image (of the scene) is considered as a mixture of five time-varying trivariate Normal distributions:

$$x \sim \sum_{i=1}^{5} \pi_i N_3\left(\mu_i, \sum_i\right),$$

where:

$$\pi_i \geq 0, i=1, \ldots, 5 \text{ and } \sum_{i=1}^{5} \pi_i = 1$$

are the mixing proportions (weights) and $N_3$ ($\mu$, $\Sigma$) denotes a trivariate Normal distribution with vector mean $\mu$ and variance-covariance matrix $\Sigma$. The distributions are trivariate to account for the three component colors (i.e., red, green and blue) of each pixel in the general case of a color camera.

Initialization of the pixel values here involves partially committing each data point to all of the existing distributions. The level of commitment is described by appropriate weighting factors. This is accomplished by the EM method noted above. The EM algorithm is used to estimate the parameters of the initial distribution $\pi_1$, $\mu_i$ and $\Sigma_i$, i=1, . . . , 5 for every pixel x in the scene. Since the EM algorithm is applied off-line over N frames, there are N data points in time available for each pixel. The data points $x_j$, j=1, . . ., N are triplets:

$$x_j = \begin{pmatrix} x_j^R \\ x_j^G \\ x_j^B \end{pmatrix}$$

where $x_j^R$, $x_j^G$, and $x_j^B$ stand for the measurement received from the red, green and blue channels of the camera for the specific pixel at time j. This data $x_1, x_2, \ldots, x_N$ are assumed to be sampled from a mixture of 5 trivariate Normals:

$$x_j \approx \sum_{i=1}^{5} \pi_i N_3\left[\begin{pmatrix} \mu_i^R \\ \mu_i^G \\ \mu_i^B \end{pmatrix}, \sigma_i^2 I\right],$$

where the variance-covariance matrix is assumed to be diagonal with $x_j^R$, $x_j^G$, and $x_j^B$ having identical variance within each Normal component, but not across all components (i.e., $\sigma_k^2 \neq \sigma_1^2$ for k≠1 components).

Originally, the algorithm is provided with some crude estimates of the parameters of interest: $\pi_1^{(0)}$, $\pi_i^{(0)}$, and $(\pi_1^{(0)})^2$. These estimates are obtained with a K-means method which commits each incoming data point to a particular distribution in the mixture model. Then, the following loop is applied.

For k=0, 1, . . . calculate:

$$z_{ij}^{(k)} = \frac{\left(\pi_i^{(k)}\left(\sigma_i^{(k)}\right)\right)^{-3/2} \exp\left\{-\frac{1}{2\left(\sigma_i^{(k)}\right)^2}(x_j - \mu_i^{(k)})'(x_j - \mu_i^{(k)})\right\}}{\sum_{i=1}^{(5)} \left(\pi_i^{(k)}\left(\sigma_i^{(k)}\right)\right)^{-3/2} \exp\left\{-\frac{1}{2\left(\sigma_i^{(k)}\right)^2}(x_j - \mu_i^{(k)})'(x_j - \mu_i^{(k)})\right\}},$$

-continued $$\pi_i^{(k+1)} = \frac{1}{N} \sum_{j=1}^{N} z_{ij}^{(k)},$$

$$\mu_i^{(k+1)} = \frac{1}{N\pi_i^{(k+1)}} \sum_{j=1}^{N} z_{ij}^{(k)} x_j,$$

$$\left(\sigma_i^{(k+1)}\right)^2 = \frac{1}{3N\pi_i^{(k+1)}} \sum_{j=1}^{N} \left(z_{ij}^{(k)}(x_j - \mu_i^{(k+1)})\right)'(x_j - \mu_i^{(k+1)}),$$

for i=1, . . . , 5 and j=1, . . . , N. Then, set k=k+1 and repeat the loop.

The condition for terminating the loop is:

$$|\pi_i^{(k+1)} - \pi_i^{(k)}| < \epsilon, \ i=1, \ldots, 5,$$

where $\epsilon$ is a 'small' positive number ($10^{-2}$). $z_{ij}^{(k)}$ are the posterior probabilities that $x_j$ belongs to the i-th distribution and they form a 5×N matrix at the k-th step of the computation. The EM process is applied for every pixel in the focal plane array (FPA) of the camera. The result is a mixture model of five Normal distributions per pixel. These Normal distributions represent five potentially different states for each pixel. Some of these states could be background states and some could be transient foreground states. The EM algorithm is computationally intensive, but since the initialization phase takes part off line, this is a non-issue.

There is a segmentation of moving objects. The initial mixture model is updated dynamically thereafter. The update mechanism is based on the incoming evidence (i.e., new camera frames). Several items could change during an update cycle:

1. The form of some of the distributions could change (weight $\pi_1$ mean $\mu_1$, and variance $\sigma_1^2$).
2. Some of the foreground states could revert to background and vice versa.
3. One of the existing distributions could be dropped and replaced with a new distribution.

At every point in time, the distribution with the strongest evidence is considered to represent the pixel's most probable background state.

The update cycle for each pixel proceeds as follows:
1. First, the existing distributions are ordered in descending order based on their weight values.
2. Second, the algorithm selects the first B distributions that account for a predefined fraction of the evidence T:

$$B = \underset{b}{\operatorname{argmin}} \left\{ \sum_{i=1}^{b} w_i > T \right\},$$

where $w_i$, i=1, . . . , b are the respective distribution weights. These B distributions are considered as background distributions while the remaining 5-B distributions are considered foreground distributions.

3. Third, the algorithm checks if the incoming pixel value can be ascribed to any of the existing Normal distributions. The matching criterion is the Jeffreys (J) divergence measure.
4. Fourth, the algorithm updates the mixture of distributions and their parameters. The nature of the update depends on the outcome of the matching operation. If a match is found, the update is performed using the method of moments. If a match is not found, then the weakest distribution is replaced with a new distribution. The update performed in this case guarantees the inclusion of the new distribution in the foreground set.

There is a matching operation. The Kullback-Leibler {KL} number between two distributions f and g is defined as:

$$K(f, g) = E_f\left[\log\left(\frac{f}{g}\right)\right] = \int \log\left(\frac{f(x)}{g(x)}\right) f(x) dx$$

A formal interpretation of the use of the KL information number is of whether the likelihood ration can discriminate between f and g when f is the true distribution.

For the purpose of the algorithm, one needs to define some divergence measure between two distributions, so that if the divergence measure between the new distribution and one of the existing distributions is "too small" then these two distributions will be pooled together (i.e., the new data point will be attached to one of the existing distributions). For a divergence measure d(f,g), it is necessary to satisfy (at least) the following three axioms:

(a) d(f,f)=0
(b) d(f,g)≧0
(c) d(f,g)=d(g,j).

The KL information number between two distributions f and g does not satisfy (c), since:

$$K(f, g) = E_f\left[\log\left(\frac{f}{g}\right)\right] \neq E_g\left[\log\left(\frac{g}{f}\right)\right] = K(g, f)$$

i.e., the KL information number is not symmetric around its arguments and thus it can not be considered as a divergence measure.

The Jeffreys divergence measure between two distributions f and g is the following:

$$J(f, g) = \int [f(x) - g(x)] \log\left[\frac{f(x)}{g(x)}\right] dx.$$

This divergence measure is closely related to the KL information number, as the following Lemma indicates:

Lemma 1:

$$J(f,g)=K(f,g)+K(g,f).$$

Proof:

$$J(f, g) = \int [f(x) - g(x)] \log\left(\frac{f(x)}{g(x)}\right) dx$$
$$\int f(x) \log\left(\frac{f(x)}{g(x)}\right) dx +$$
$$\int g(x) \log\left(\frac{g(x)}{f(x)}\right) dx$$
$$= K(f, g) + K(g, f).$$

The J(f,g) is now symmetric around its arguments since:

$$J(f,g)=K(f,g)+K(g,f)K(g,f)+K(f,g)=J(g,f)$$

and satisfies also axioms (a) and (b). Thus J(f,g) is a divergence measure between f and g.

J(f,g) is used to determine whether the new distribution matches or not to one of the existing five distributions. The five existing Normal distributions are: $f_i \sim N_3(\mu_i, \sigma_i^2 I)$, i=1, ..., 5. The incoming distribution is $g \sim N_3(\mu_g, \sigma_g^2 I)$. We assume that:

$$\mu_g = x_t \text{ and } \sigma_g^2 = 25,$$

where $x_t$ is the incoming data point. The five divergence measures between g and $f_i$, i=1, ..., 5 will be given by the following formula:

$$J(f_i, g) = \frac{3}{2}\left(\frac{\sigma_i}{\sigma_g} - \frac{\sigma_g}{\sigma_i}\right)^2 + \frac{1}{2}\left(\frac{1}{\sigma_i^2} + \frac{1}{\sigma_g^2}\right)(\mu_g - \mu_i)'(\mu_g - \mu_i).$$

Once the five divergence measures have been calculated, the distribution $f_j(1 \leq j \leq 5)$ is found for which:

$$J(f_j,g)=_{1 \leq i \leq 5}^{mm}\{J(f_i,g)\}$$

and there is a match between $f_j$ and g if and only if $$J(f_j,g) \leq K^*,$$

where K* is a prespecified cutoff value. In the case where $J(f_j,g)>K^*$ then the new distribution g cannot be matched to any of the existing distributions.

There is a model update when a match is found. If the incoming distribution matches to one of the existing distributions, these two are pooled together to a new Normal distribution. This new Normal distribution is considered to represent the current state of the pixel. The state is labeled either background or foreground depending on the position of the matched distribution in the ordered list of distributions.

The parameters of the mixture are updated with the method of moments. First introduced is some learning parameter α which weighs on the weights of the existing distributions. A 100 α% weight is subtracted from each of the five existing weights and it is assigned to the incoming distribution's weight. In other words, the incoming distribution has weight α since:

$$\sum_{i=1}^{5} \alpha \pi_i = \alpha \sum_{i=1}^{5} \pi_i = \alpha$$

and the five existing distributions have weights:

$$\pi_i(1-\alpha), i=1, \ldots, 5.$$

Obviously, for α, 0<α<1 is needed. The choice of α depends mainly on the choice of K*. The two quantities are inversely related. The smaller the value of K*, the higher the value of α and vice versa. The values of K* and α are also affected by how much noise there is in the monitoring area. So if, for example, an outside region was being monitored and had much noise due to environmental conditions (i.e., rain, snow, etc.), then a "high" value of K* and thus a "small" value of a would be needed since a non-match to one of the distributions is very likely to be caused by background noise.

On the other hand, if the recording was being done indoors where the noise is almost non-existent, then a "small" value of K* and thus a higher value of α would be preferred, because any time there is not a match to one of the existing five distributions, it is very likely to occur due to some foreground movement (since the background has almost no noise at all).

Assuming that there is a match between the new distribution g and on of the existing distributions $f_j$, where $1 \leq j \leq 5$, then the weights of the mixture model are updated as follows:

$\pi_{i,t} = (1-\alpha)\pi_{i,t-1}$ $i=1, \ldots, 5$ and $i \neq j$ $\pi_{j,t} = (1-\alpha)\pi_{j,t-1} + \alpha$ The mean vectors and variances are also updated. If $w_1$ is $(1-\alpha)\pi_{J,t-1}$, i.e., $w_1$ is the weight of the j-th component (which is the winner in the match) before pooling it with the new distribution g, and if $w_2 = \alpha$, i.e., the weights of the new observation then define:

$$\rho = \frac{w_2}{w_1 + w_2} = \frac{\alpha}{(1-\alpha)\pi_{j,t-1}} + \alpha.$$

Using the method of moments leads to:

$\mu_{j,t} = (1-\rho)\mu_{j,t-1} + \rho\mu_g$ $\sigma_{j,t}^2 = (1-\rho)\sigma_{j,t-1}^2 + \rho\sigma_g^2 + \rho(1-\rho)(x_t - \mu_{j,t-1})^t(x_t - \mu_{j,t-1})$, while the other 4 (unmatched) distributions keep the same mean and variance that they had at time $t-1$.

There is a model update when a match is not found. In the case where a match is not found (i.e., $\min_{1 \leq I \leq 5} K(f_i, g) > K^*$), then the current pixel state is committed to be foreground and the last distribution in the ordered list is replaced with a new one. The parameters of the new distribution are computed as follows:

1. The mean vector $\mu_5$ is replaced with the incoming pixel value.
2. The variance $\sigma_5^2$ is replaced with the minimum variance from the list of distributions.
3. The weight of the new distribution is computed as follows:

$$w_{5,t+1} = \frac{1-T}{2},$$

where T is the background threshold index. This formula guarantees the classification of the current pixel state as foreground. The weights of the remaining four distributions are updated according to the following formula:

$$w_{i,t+1} = w_{i,t} + \frac{w_{5,t} - (1-T)/2}{4}.$$

Multiple hypotheses are developed for predictive tracking. In the above, there was described a statistical procedure to perform on-line segmentation of foreground pixels corresponding to moving objects of interest, i.e., people and vehicles. Here, how to form trajectories traced by the various moving objects is described. The basic requirement for forming object trajectories is the calculation of blob centroids (corresponding to moving objects). Blobs are formed after a standard 8-connected component analysis algorithm is applied to the foreground pixels. The connected component algorithm filters out blobs with an area less than $A = 3 \times 9 = 27$ pixels as noise. This is the minimal pixel footprint of the smallest object of interest (e.g., a human) in the camera's FOV.

A multiple hypotheses tracking (MHT) is then employed that groups the blob centroids of foreground objects into distinct trajectories. MHT is considered to be the best approach to multi-target tracking applications. It is a recursive Bayesian probabilistic procedure that maximizes the probability of correctly associating input data with tracks. Its superiority against other tracking algorithms stems from the fact that it does not commit early to a trajectory. Early commitment usually leads to mistakes. MHT groups the input data into trajectories only after enough information has been collected and processed. In this context, it forms a number of candidate hypotheses regarding the association of input data with existing trajectories. MHT has shown to be the method of choice for applications with heavy clutter and dense traffic. In difficult multi-target tracking problems with crossed trajectories, MHT performs very well.

Figure 9:
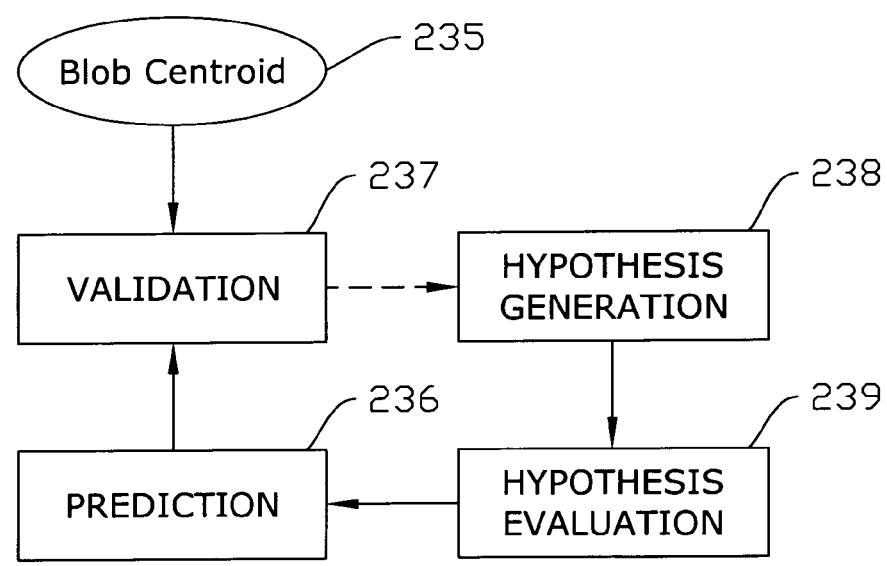
FIG. 9 is a diagram of the architecture of a multiple hypotheses tracking algorithm.

FIG. 9 depicts the architecture of the multiple hypotheses tracking (MHT) algorithm involving a blob centroid 235. The modules of this algorithm are prediction 236, validation 237, hypothesis generation 238 and hypothesis evaluation 239. An integral part of any tracking system is prediction module 236. Prediction provides estimates of moving objects' states and in the present system is implemented as a Kalman filter. Kalman filter predictions are made based on prior models for target dynamics and measurement noise.

The state vector describing the motion of a foreground object (blob) consists of the position and velocity of its centroid expressed in pixel coordinates, i.e., $x_k = (x_k, \dot{x}_k, y_k, \dot{y}_k)^T$.

The state space model is a constant velocity model given by:

$x_{k+1} = F_k x_k + u_k$, with transition matrix $F_k$:

$$F_k = \begin{pmatrix} 1 & dt & 0 & 0 \\ 0 & 1 & 0 & 0 \\ 0 & 0 & 1 & dt \\ 0 & 0 & 0 & 1 \end{pmatrix}.$$

The process noise is white noise with a zero mean and covariance matrix:

$$Q_k = E[u_k u_k^T] = \begin{pmatrix} \frac{dt^3}{3} & \frac{dt^2}{2} & 0 & 0 \\ \frac{dt^2}{2} & dt & 0 & 0 \\ 0 & 0 & \frac{dt^3}{3} & \frac{dt^2}{2} \\ 0 & 0 & \frac{dt^2}{2} & dt \end{pmatrix} q,$$

where q is the process variance. The measurement model describes how measurements are made and it is defined by:

$z_k = H x_k + v_k$ with $$H = \begin{pmatrix} 1 & 0 & 0 & 0 \\ 0 & 0 & 1 & 0 \end{pmatrix},$$

and a constant 2×2 covariance matrix of measurement noise given by:

$$R_k = E[v_k v_k^T].$$

Based on the above assumptions, the Kalman filter provides minimum mean squared estimates $\hat{x}_{k|k}$ of the state vector according to the following equations:

$$K_k = P_{k|k-1} H^T [H P_{k|k-1} H^T + R_k]^{-1}$$

$$P_{k|k} = [I - K_k H] P_{k|k-1}$$

$$P_{k+1|k} = F k P_{k|k} F_k^T + Q_k$$

$$\hat{x}_{k|k} = \hat{x}_{k|k-1} + K_k [Z_k - H \hat{x}_{k|k-1}]$$

$$\hat{x}_{k+1} = F_k \hat{x}_{k|k}.$$

Validation 237 is a process which precedes the generation of hypotheses 238 regarding associations between input data (blob centroids 235) and the current set of trajectories (tracks). Its function is to exclude, early-on, associations that are unlikely to happen thus limiting the number of possible hypotheses to be generated. The vector difference between measured and predicted states $v_k$ is a random variable characterized by the covariance matrix $S_k$:

$$v_k = z_k - H \hat{x}_{k|k-1}$$

$$S_k = H P_{k|k-1} H^T + R_k.$$

For every track from the list of current tracks there exists an associated gate. A gate can be visualized as an area surrounding a track's predicted location (next move). In the present case, a gate is an elliptical shape defined by the squared Mahalanobis distance:

$$d^2 = v_k^T S_k^{-1} c_k.$$

An incoming measurement (blob centroid 235) is associated with a track only when it falls within the gate of the respective track. Mathematically this is expressed by:

$$d^2 \leq D_{threshold}$$

The result of validating a new set of blob centroids takes the form of an ambiguity matrix. An example of an ambiguity matrix corresponding to a hypothetical situation of an existing set of two tracks ($T_1$ and $T_2$) and a current set of three measurements ($z_1(k)$, $z_2(k)$ and $z_3(k)$) is given in Equation (1).

$$\Omega = \begin{pmatrix} T_F & T_1 & T_2 & T_N \\ 0 & 1 & 0 & 0 \\ 0 & 0 & 1 & 0 \\ 0 & 0 & 0 & 1 \end{pmatrix} \begin{matrix} z_1(k) \\ z_2(k) \\ z_3(k) \end{matrix} \quad \text{Equation (1)}$$

The columns of the ambiguity matrix denote the current set of tracks with the first and last columns being reserved for false alarms ($T_F$) and new tracks ($T_N$), respectively. The rows correspond to the particular measurements of blob centroids made on the current frame. Non zero elements of the ambiguity matrix signal that the respective measurements are contained in are in the validation region of the associated track. The assignments are further constrained in the ambiguity matrix by allowing each measurement in the current scan to be associated with only one track. Further, it is assumed that a track is paired with at most one measurement per iteration. Therefore, the number of non zero elements in any row or column (barring the first and last columns) is limited to one. Thus, the ambiguity matrix is made a cost matrix as it is defined in linear assignment problems. This formulation makes the ambiguity matrix a representation of a new set of hypotheses about blob centroid-track pairings.

Central to the implementation of the MHT algorithm is the generation 238 and representation of track hypotheses. Tracks are generated based on the assumption that a new measurement may:

1. belong to an existing track;
2. be the start of a new track;
3. be a false alarm.

Figures 10, 11:
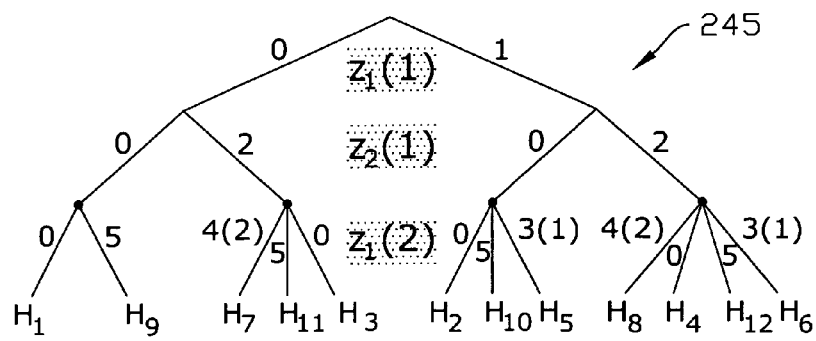
FIG. 10 is a hypothesis matrix.
FIG. 11 a hypothesis tree diagram.

Assumptions are validated through the validation process 237 before they are incorporated into the hypothesis structure. The complete set of track hypotheses can be represented by a hypothesis matrix 240 as shown in FIG. 10. The hypothetical situation in Table I corresponds to a set of two scans of 2 and 1 measurements made respectively on frame k=1 and k+1=2. Some notation clarification is in order. A measurement $z_j(k)$ is the $j^{th}$ observation (blob centroid 235) made on frame k. In addition, a false alarm is denoted by 0 while the formation of a new track ($T_{newID}$) generated from an old track ($T_{oldID}$) is shown as $T_{newID}$ ($T_{oldID}$)

The first column 241 in this table is the Hypothesis index. In the example case, there are a total of 4 hypotheses generated during scan 1 shown in column portion 242, and 8 more are generated during scan 2 shown in column portion 243. The last column 244 lists the tracks that the particular hypothesis contains (e.g., hypothesis $H_8$) contains tracks no 1 and no. 4). The row cells in the hypothesis table denote the tracks to which the particular measurement $z_j(k)$ belongs (e.g., under hypothesis $H_{10}$ the measurement $z_1(2)$ belongs to track no. 5). A hypothesis matrix is represented computationally by a tree structure 245 as it is schematically shown in FIG. 11. The branches of the tree are in essence the hypotheses about measurements-track associations.

As it is evident from the above example, hypothesis tree 245 can grow exponentially with the number of measurements. Two measures are applied to reduce the number of hypotheses. The first measure is to cluster the hypotheses into disjoint sets. In this sense, tracks which do not compete for the same measurements compose disjoint sets which in turn are associated with disjoint hypothesis trees. The second measure is to assign probabilities on every branch of hypothesis trees. The set of branches with the $N_{hypo}$ highest probabilities are only considered. A recursive Bayesian methodology is followed for calculating hypothesis probabilities from frame to frame.

Multi-camera fusion is helpful in tracking objects and people. Monitoring of large sites can be best accomplished only through the coordinated use of multiple cameras. A seamless tracking of humans and vehicles is preferred across the whole geographical area covered by all cameras. A panoramic view is produced by fusing the individual camera FOV's. Then object motion is registered against a global coordinate system. Multi-camera registration (fusion) is achieved by computing the Homography transformation between pairs of cameras. The homography computation procedure takes advantage of the overlapping that exists between pairs of camera FOV's. Pixel coordinates of more than 4 points are used to calculate the homography transformation matrix. These points are projections of physical ground plane points that fall in the overlapping area between the two camera FOV's. These points are selected and marked on the ground with paint during the installation phase. Then the corresponding projected image points are sampled through the Graphical User Interface (GUI). This is a process that happens only in the beginning and once the camera cross-registration is complete it is not repeated. In order to achieve optimal coverage with the minimum number of sensors, the cameras are placed far apart from each other and at varying angles. A sophisticated warping algorithm may be used to accommodate the large distortions produced by the highly non-linear homography transformations.

Figure 12:
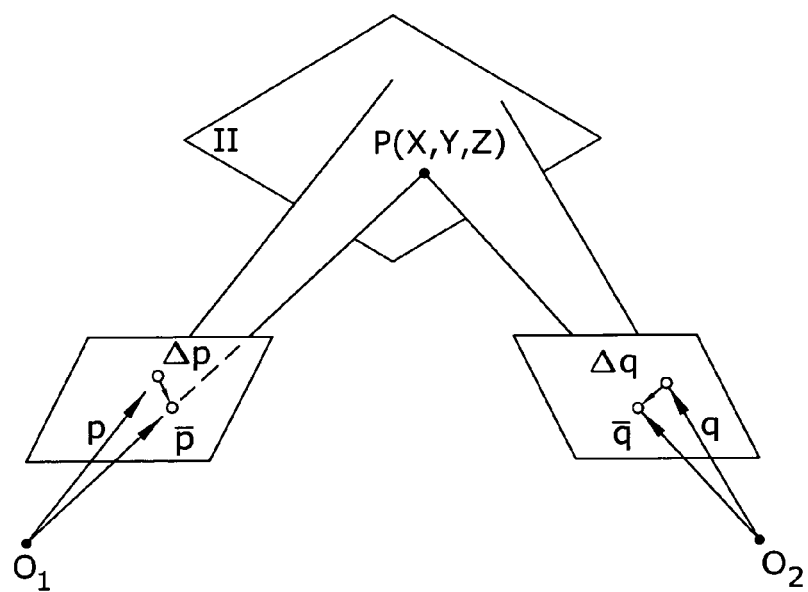
FIG. 12 shows the fields of view of two cameras having a common area.

An algorithm is used to compute the homography matrices. The algorithm is based on a statistical optimization theory for geometric computer vision and cures the deficiencies exhibited by the least squares method. The basic premise is that the epipolar constraint may be violated by various noise sources due to the statistical nature of the imaging problem. In FIG. 12, the statistical nature of the imaging problem affects the epipolar constraint. $O_1$ and $O_2$ are the optical centers of the corresponding cameras. P(X, Y, Z) is a point in the scene that falls in the common area between the two camera FOV's. Ideally, the vectors $\overrightarrow{O_1 p}$, $\overrightarrow{O_2 q}$ and $\overrightarrow{O_1 O_2}$ are co-planar. Due to the noisy imaging process, however, the actual vectors $\overrightarrow{O_1 p}$, $\overrightarrow{O_2 q1}$ and $\overrightarrow{O_1 O_2}$ may not be co-planar.

In particular, for every camera pair, a 3×3 homography matrix H is computed such that a number of world points $P_\alpha(X_\alpha, Y_\alpha, Z_\alpha)$, $\alpha=1, 2, \ldots, N$ and $N \geq 4$, projected into the image points $p_\alpha$ and $q_\alpha$ the following equations holds:

$$\overline{p}_\alpha x\, H\overline{q}_\alpha = 0,\ \alpha = 1, 2, \ldots, N. \quad \text{Equation (2)}$$

Notice that the symbol (x) denotes the exterior product and also that the above equation does not hold for the actual image points $p_\alpha$ and $q_\alpha$ but for the corresponding ideal image points $\overline{p}_\alpha$ and $\overline{q}_\alpha$ for which the epipolar constraint is satisfied (see FIG. 12). Equivalently, the above equation (2) can be written as:

$$(X_\alpha^{(k)}; H) = 0,\ k = 1, 2, 3 \quad \text{Equation (3)}$$

with:

$$X_\alpha^{(k)} = e^{(k)} x \overline{p}_\alpha \overline{q}_\alpha^T,\ \alpha = 1, 2, \ldots N, \quad \text{Equation (4)}$$

where for any two matrices A and B $(A;B) = \text{tr} A^T B$ and $e^{(1)} = (1, 0, 0)^T$, $e^{(2)} = (0, 1, 0)^T$, $e^{(3)} = (0, 0, 1)^T$. In a statistical framework, homography estimation is equivalent to minimizing the sum of the following squared Mahalanobis distances:

$$J[H] = \frac{1}{N} \sum_{\alpha=1, k}^{N} \sum_{l=1}^{3} (\Delta X_\alpha^{(k)}, V(X_\alpha^{(k)}, X_\alpha^{(l)}) \Delta X_\alpha^{(l)}),$$

under the constraints described by the above equation (3). Note that the covariant tensor of the matrices $\Delta X_\alpha^{(k)}$ and $\Delta X_\alpha^{(l)}$ is denoted by:

$$v(X_\alpha^{(k)}, X_\alpha^{(l)}) = E[\Delta X_\alpha^{(k)} \Delta X_\alpha^{(l)}],$$

where $\Delta X_\alpha^{(k)} = X_\alpha^{(k)} - \overline{X}_\alpha^{(k)}$. The symbol () denotes tensor product. If one uses Lagrange multipliers, estimation of the homography matrix H reduces to the optimization of the following functional J[H]:

$$J[H] = \frac{1}{N} \sum_{\alpha=1, k}^{N} \sum_{l=1}^{3} (W_\alpha^{kl}(H)(X_\alpha^{(k)}; H)(X_\alpha^{(l)}; H)). \quad \text{Equation (5)}$$

The (3×3) weight matrix $W_{60}$ (H) is expressed as:

$$W_{\alpha(H)} = (p_\alpha x\, HV[q_\alpha]H^T x\, p_\alpha + (H\, q_\alpha) x V[p_\alpha](H\, q_\alpha))_2 \quad \text{Equation (6)}$$

The symbol $(.)_r^-$ symbolizes the generalized inverse of a matrix (N×N) computed by replacing the smallest (N−r) eigenvalues by zeros. The computation process for the optimization of the functional in Equation (5) proceeds as follows:

1. Initialization begins by setting the parameter c=0 and the weights $W_\alpha = I$ for $\alpha = 1, \ldots, N$.
2. Proceed by computing the following matrices:

$$M = \frac{1}{N} \sum_{\alpha=1, k}^{N} \sum_{l=1}^{3} W_\alpha^{(kl)} X_\alpha^{(k)} \otimes X_\alpha^{(l)}$$

$$N = \frac{1}{N} \sum_{\alpha=1, k}^{N} \sum_{l=1}^{3} W_\alpha^{(kl)} v(X_\alpha^{(k)}, X_\alpha^{(l)}).$$

3. Next calculate the smallest eigenvalue $\lambda_{mm}$ of $\hat{M} = M - cN$ and the associated eigenvector $H_{mm}$.
4. If $\lambda_{mm} \to 0$ then the estimated homography matrix $\hat{H} = H_{min}$ is returned and the program exits. Otherwise, the weights $W_\alpha$ are updated according to Equation (6) and the value of $C_{old}$ is updated according to:

$$c_{old} = c_{old} + \frac{\lambda_{\min}}{(H_{\min}; N H_{\min})}.$$

In this latter case, the computation continues by looping back though step 2.

Due to the specific arrangement of the cameras (large in-between distances and varying pointing angles), the homographies introduce large distortions for those pixels away from the overlapping area. An interpolation scheme is used to compensate for the excessively non-linear homography transformation.

The scheme is a warping algorithm which interpolates simultaneously across both dimensions. Specifically, the warping computation proceeds as follows:

Step 1. Map the pixel grid of the original image to a warped grid as it is prescribed by the homography transformation. This in general results into mapping the regular rectangular grid of the original image to an irregular quadrilateral grid 246 in the warped space (see FIG. 13).

Step 2. The warped pixel coordinates in general may take any positive or negative values. Scale these coordinates to a normalized positive range.

Figure 13:
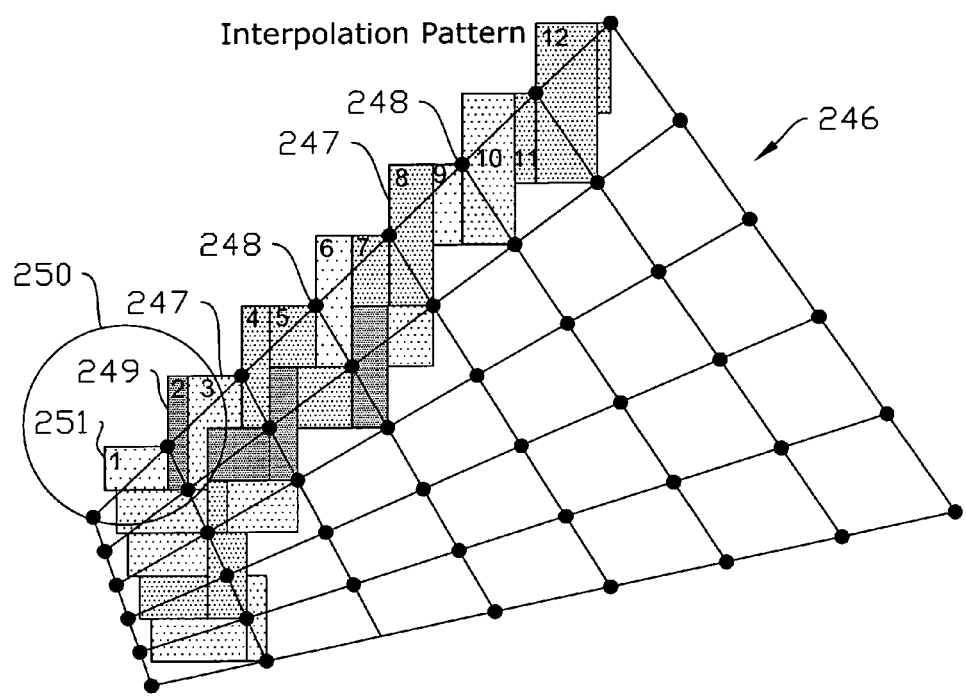
FIG. 13 is a mapping result of one grid of an image onto a grid of a warped image.
Figure 14:
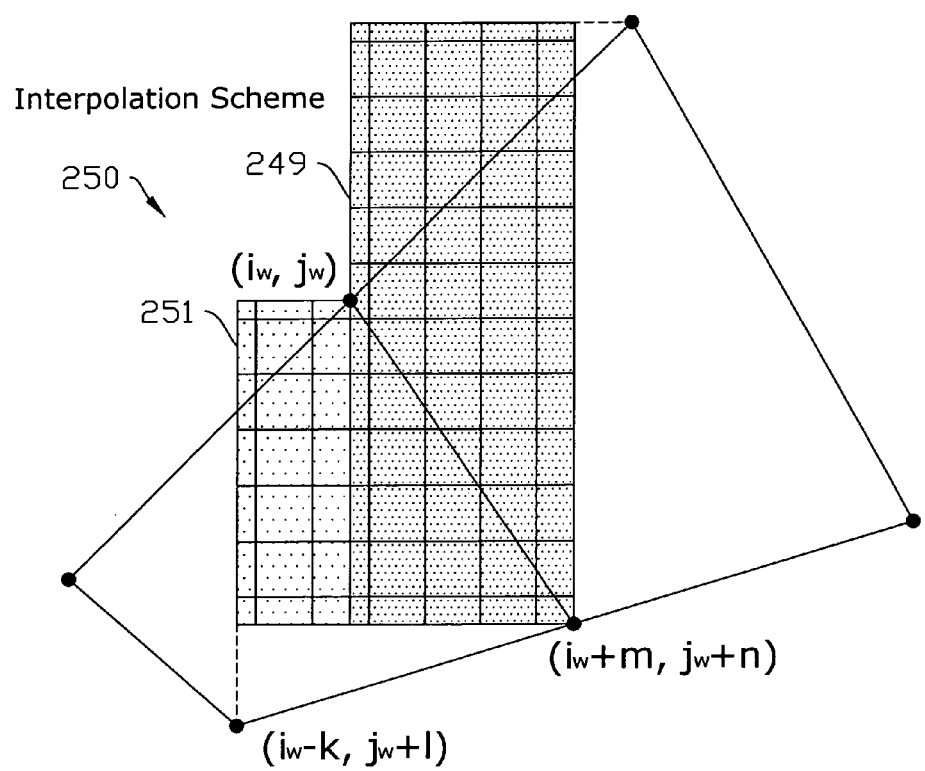
FIG. 14 is a close up view of a portion of the mapping revealed in FIG. 13.

Step 3. Employ an interpolation scheme to fill out the pixel values in the warped space. One can visualize why such an interpolation is necessary if one overlays the warped pixel grid on the regular pixel grid as shown in FIG. 13. The shaded rectangles 247 represent the intermediate regular pixel locations that mediate between the warped grid nodes 248. The warping algorithm should assign intensity values to these intermediate regular pixel locations in order to form properly the warped image. A blown-out view 250 of the region containing rectangles 1 (251) and 2 (249) in FIG. 13 is shown in FIG. 14. The shaded rectangular area 29 is the 'gap' between the warped nodes $(i_w,j_w)$ and $(i_w+m,j_w+n)$. This area may contain full regular pixel locations in the middle and partial regular pixel locations in the border (left, right, top, and bottom). Assign intensity values to these partial or full pixel locations by weighing the intensity at the warped node $(i_w,j_w)$ with their area A $(0<A\leq 1)$.

Step 4. Apply the above two-dimensional interpolarization scheme from left to right and top to bottom until the nodes in the warped pixel grid are exhausted.

Step 5. Finally, map the normalized warped coordinates back to the unnormalized warped coordinates for proper positioning of the image in the universal image plane of the observed area.

Image processing component 102 can provide threat assessments of an object or person tracked. Component 102 can alert security or appropriate personnel to just those objects or persons requiring their scrutiny, while ignoring innocuous things. This is achieved by processing image data in image processing component 102 through a threat assessment analysis which is done after converting thee pixel coordinates of the object tracks into a world coordinate system set by image processing component 102. Known space features, fixed objects or landmarks are used in coordinate reference and transformation. The assembly of features uses the trajectory information provided by image processing module 102 to compute relevant higher level features on a per vehicle/pedestrian basis. The features are designed to capture "common sense" beliefs about innocuous, law abiding trajectories and the known or supposed patterns of intruders. The features calculated include:

number of sample points
 starting position (x,y)
 ending position (x,y)
 path length
 distance covered (straight line)
 distance ratio (path length/distance covered)
 start time (local wall clock)
 end time (local wall clock)
 duration
 average speed
 maximum speed
 speed ratio (average/maximum)
 total turn angles (radians)
 average turn angles
 number of "M" crossings Most of these are self explanatory, but a few are not so obvious. The wall clock is relevant since activities on some paths are automatically suspect at certain times of day—late night and early morning particularly.

The turn angles and distance ratio features capture aspects of how circuitous was the path followed. The legitimate users of the facility tend to follow the most direct paths permitted by the lanes. 'Browsers' may take a more serpentine course.

The 'M' crossings feature attempts to monitor a well-known tendency of car thieves to systematically check multiple parking stalls along a lane, looping repeatedly back to the car doors for a good look or lock check (two loops yielding a letter 'M' profile). This can be monitored by keeping reference lines for parking stalls and counting the number of traversals into stalls.

The output of the feature assembly for trajectories is recorded from a site observed of some period of time and is stored. That storage is used to produce threat models based on a database of features. During trial periods of time, several suspicious events can be staged (like "M" type strolls or certain inactivities) to enrich the data collection for threat assessments. Individual object or person trajectories or tracks may be manually labeled as innocuous (OK) or suspicious (not OK or a threat). A clustering algorithm assists in the parsimonious descriptions of object or person behavior. The behavior database consists of the labeled trajectories or tracks and the corresponding vectors. They are processed by a classification tree induction algorithm. Then the resultant classifier classifies incoming line data as OK or not OK.

Image processing component 102 detects and tracks moving objects or people. In the event that several people are moving alongside each other, they may be tracked as a single object, but may split into two or more objects and be detected as several tracks. Tracking can be lost because the people are obscured by equipment or natural obstructions. However, tracking will be correctly resumed once the people reappear. Additional cameras may be used if split tracks become a security loophole. Image processing 104 can recognize objects or people that disappear and appear within an FOV within short time intervals. This recognition function may be achieved by higher resolution cameras to capture detailed features of cars and especially humans. The cameras may have automated zoom mechanisms for being able to zoom in momentarily on every detected object or person and capture a detailed object signature. Tracking can be done under light or in the dark.

In summary, the tracking approach is based on a multi-Normal mixture representation of the pixel processes and on the Jeffrey divergence measure for matching to foreground or background states. This matching criterion results into dynamic segmentation performance. The tracking (MHT) algorithm and external multi-camera calibration are achieved through the computation of homographies. A warping algorithm which interpolates simultaneously across two dimensions addresses excessive deformations introduced by the homography. A threat assessment analysis based on a tree induction algorithm reports suspicious patterns detected in the annotated trajectory data. The threat assessment analysis includes a clustering algorithm. The algorithm helps in the automation of assessment and classification of objects and people.

Figure 15:
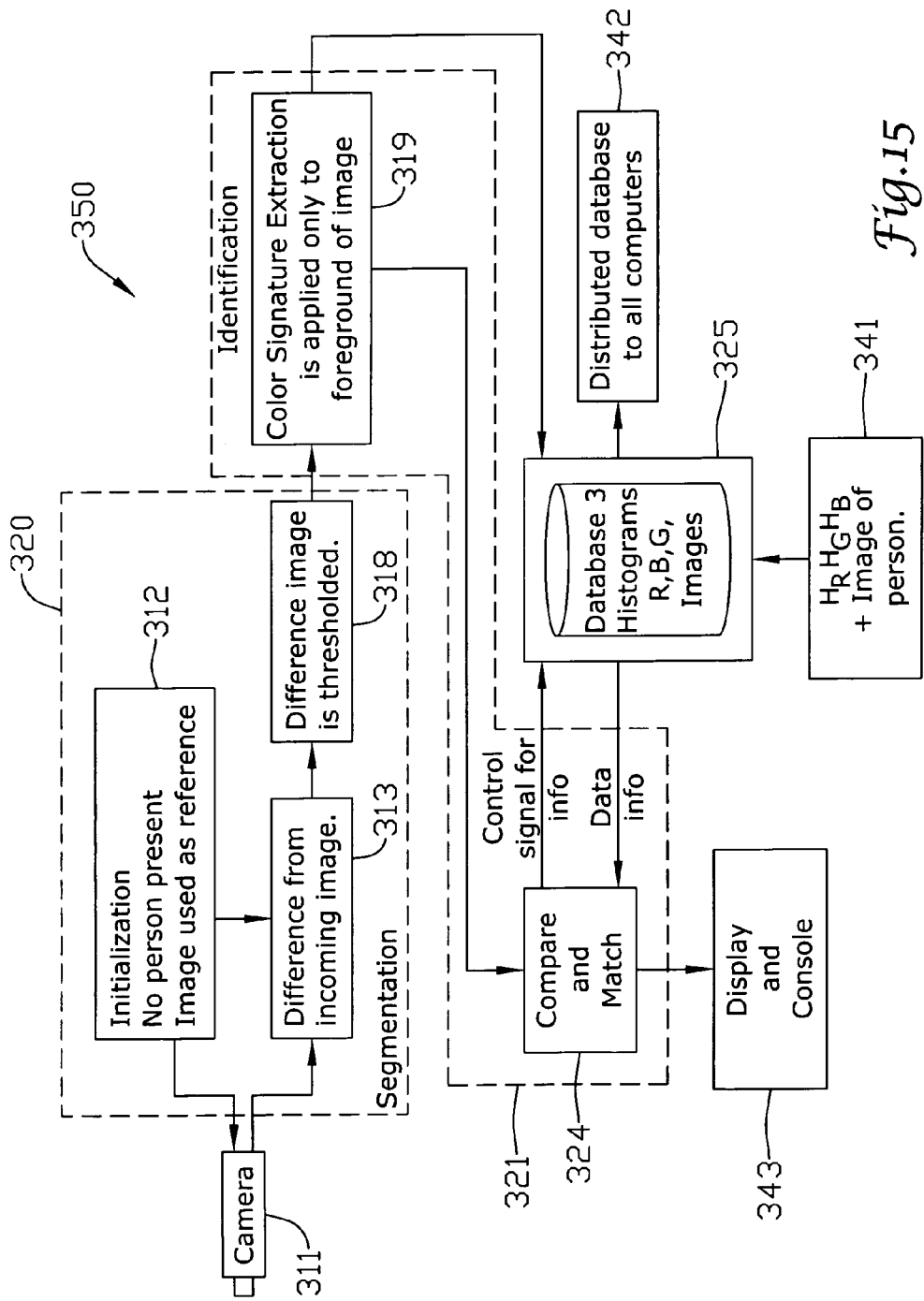
FIG. 15 is a diagram of significant components of the identification aspect of the cooperative camera network.
Figure 16A:
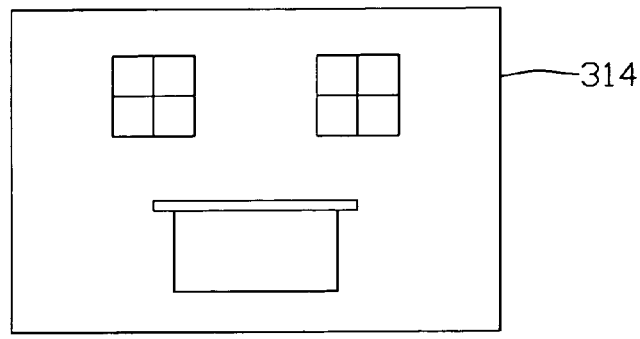
FIGS. 16a, 16b, 16c and 16d show examples of the background, foreground, differenced and thresholded images.
Figure 16B:
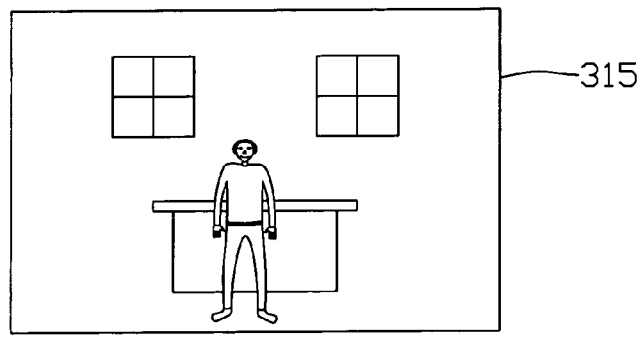
Figure 16C:
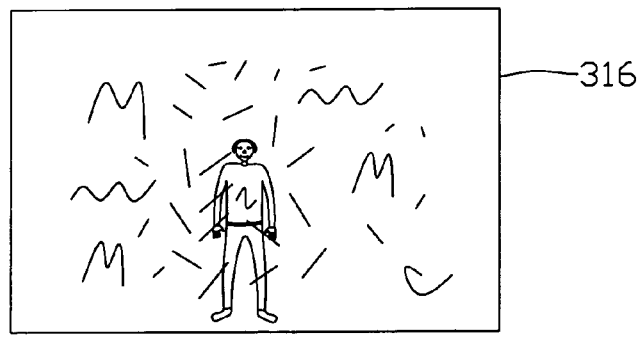
Figure 16D:
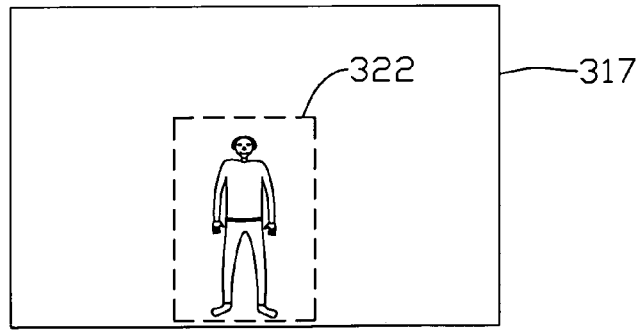

FIG. 15 shows some of the components of the cooperative camera network. Camera 311 is an imaging device which has a first image 314 of a setting which becomes background. This is an initialization 312 stage. It results in a reference image where no person or object likely to be identified and/or tracked is present. One can reinitialize to remove an object from the foreground in FIG. 16a. The next image at the same location could include a person as in FIG. 16b. This would be an image to be differenced with the reference image at component 313. A difference image 316, in FIG. 16c, shows the person without the background. This image retains what is subsequently and essentially different between the reference image and the next image with only the person or foreground present. The background is that which is in reference image 314 and the foreground is that which is new in the incoming object image 315. Since there are areas or regions of the initial image and the object image that are marginally similar or dissimilar, a threshold value is set by the thresholding component 318 to determine which portions of the reference and object images are to be regarded as dissimilar or vice versa. The resultant image after thresholding is a clearer segmented image 317 in FIG. 16*d*. This process between the imaging device or camera and the output of component 318 is the segmentation component 320.

The DifferencingThresholding portion of the present system performs the difference and thresholding operation upon the incoming image. The most important pieces of code for the function are shown in Listing 1 below. The function carries as an input parameter the pointer pData to the incoming frame's pixel values. The pixel values of the reference frame have already been stored in the member variable m_ReferenceImage. Therefore, one is ready to perform the subtraction operation of the incoming frame from the reference frame (lines 5–13, Listing 1). One subtracts pixel by pixel per color plane; this is the reason for the triple for loop in lines 5–7 of Listing 1.

After having obtained the difference image one applies the thresholding algorithm upon it (lines 15–17, Listing 1). Actually, one applies the thresholding operation per each color plane (red, green, and blue). Three different threshold values are produced, one for the red, one for the green, and one for the blue components of the pixel values. Then, in line 25 of Listing 1 one weighs to see if any of the color values of a pixel is above or below the corresponding threshold value. If it is, then one maintains in the threshold image the original pixel value (lines 28–33, Listing 1). If it is not, then one zeros the pixel value in the threshold image (lines 38–40, Listing 1). This weighing process repeats for every pixel in the image (lines 21–24, Listing 1).

In line 34 of Listing 1, one keeps count of the number of pixels that have a color component above the corresponding threshold. Then in line 46, one checks if the percentage of the pixels found to be sufficiently different exceeds a certain overall percentage threshold. The overall percentage threshold variable m_ThresholdValue is set by the operator. In the default version of the code, it has been set to 0.5, which means that if more than 50 percent of the image's pixels have changed sufficiently from the reference image, an alarm is set off. The reader may set this variable higher or lower depending on how sensitive one prefers the change detection system to be.

Listing 1: The DifferencingThresholding function definition.

```
1:  bool CChangeFilter: :DifferencingThresholding(BYTE* pData)
2:  {
3:      ...
4:      // compute the difference between incoming and reference images
5:      for (i=0; i<m_height; i++)
6:          for (j=0; j<m_width; j++)
7:              for (k=0; k<m_colors; k++)
8:              {
9:                  if ((*(pData + k + m_colors*(j*m_height + i))) >=
                            *(m_ReferenceImage + k + m_colors*(j*m height +
                        i)))
10:                 {
11:                     *(m_DifferenceImage + k + m_colors*(j*m_height + i)) =
                            (BYTE) ( (* (pData + k + m_colors*(j*m_height + i)))
                            -
                            (*( m_ReferenceImage + k + m_colors*(j*m_height +
                        i))));
12:                 {
13:                     ...
14:     // apply the adaptive thresholding algorithm
15:     float redThr = GetImageThreshold(RED);
16:     float greenThr =GetImageThreshold(GREEN);
17:     float blueThr = GetImageThreshold(BLUE);
18:
19:     // based on the computed thresholds binarize the pixel values
20:     int tally = 0;
21:     for (i=0; i<m_height; i++)
22:     {
23:     for (j=0; j<m_width; j++)
24:         {
25:                     if( (*(m_DifferenceImage + 0 + m colors*(j*m_height + i))
                        >
                                    ((int) redThr ) + 25) ||
                            (*(m_DifferenceImage + 1 + m_colors*(j*m_height + i))
                        >
                                    ((int) greenThr ) + 25) ||
                            (*(m_DifferenceImage + 2 + m_colors*(j*m height +i))
                        >
                                    ((int) blueThr ) + 25))
26:             {
27:                 // index back to the original image pixels
28:                 *(m_ThresholdImage + 0 + m_colors*(j*m_height + i)) =
29:                     (*(pData + 0 + m_colors*(j*m_height +i)));
30:                 *(m_ThresholdImage + 1 + m_colors*(j*m_height + i)) =
31:                     (*(pData + 1 + m_colors*(j*m_height + i)));
```

-continued

Listing 1: The DifferencingThresholding function definition.

```
32:                    *(m_ThresholdImage + 2 + m_colors*(j*m_height + i)) =
33:                        (*(pData + 2 + m_colors*(j*m_height + i)));
34:                    tally = tally + 1;
35:                }
36:                else
37:                {
38:                    *(m_ThresholdImage + 0 + m_colors*(j*m_height + i)) =
39:                    *(m_ThresholdImage + 1 + m_colors*(j*m_height + i)) =
40:                    *(m_ThresholdImage + 2 + m_colors*(j*m_height + i)) =
(BYTE) 0;
41:                . }
42:        }
43: }
44: ...
45: // is intrusion detected (a "large enough" difference was found)?
46: if ( ( 100.0 * ((float)tally) /
((float) (m_width*m_height*m_colors)))
                            > m_ThresholdValue)
47: ...
```

One point of great interest that one has left unanswered so far is how exactly the threshold values redThr, greenThr, and blueThr are computed for the three color planes of the image. One is about to get an answer to this question by dissecting the function GetImageThreshold in the following. Next, one notes the thresholding algorithm. Thresholding offers a method of segmentation in image processing. One is trying to delineate foreground from background pixels in tricolor difference images. One is interested less about background pixels and for this reason one depicts them as black. For the foreground pixels, however, one maintains the exact color values included in the incoming image. Thus, if for example a human or other object has moved in the original scene then, all the scene appears black in the thresholded image except the region where the human or object exists. This human or other silhouette represents the change that was introduced in the original reference scene. The change is measurable in terms of number of pixels and if it exceeds a certain percentage of the overall pixel population then, it sets off an alarm.

But, one may ask how exactly thresholding determines if a pixel belongs to the foreground or background. Or, equivalently, if it should be painted black or maintain its original color. In color images such as the ones one is dealing in this case, three separate thresholds can be established for the corresponding color channels. For each color channel the range of values of the pixels is [0–255], where 0 represents the absence of color and 255 the full color. In an ideal world, with no light changes and without sensor noise, the difference image would not need thresholding at all. The difference pixels in the regions of the scene that haven't changed would cancel out completely. In the real world, however, the difference pixels corresponding to unchanged scene points may not cancel out completely and present nonzero values. Still, the difference pixels that correspond to scene points that have drastically changed due to the presence of a foreign object usually present higher residual values.

Therefore, one has on each color plane of the difference image two distributions of color pixel values. One distribution is clustered towards the lower portion of the intensity range [0–255] and represents color pixel values that correspond to background points. The other distribution is clustered towards the higher portion of the intensity range [0–255] and represents color pixel values that correspond to foreground points. There is often some overlapping between the background and foreground distributions. A good thresholding algorithm locates the demarcation (thresholding) point in such a way that minimizes the area of one distribution that lies on the other side's region of the threshold.

It is very important to realize that one knows only the parameters of the total pixel distribution per color channel. One assumes that the background and foreground distributions exist within it. One may not know exactly what they are. One might try to guess by computing a value that separates them (threshold). As one adjusts the threshold, one increases the spread of one distribution and decreases the other. One's goal is to select the threshold that minimizes the combined spread.

One can define the within-class variance $\sigma_w^2$ (t) as the weighted sum of variances of each distribution.

$$\sigma_w^2(t) + w_1(t)\sigma_1^2(t) + w_2(t)\sigma_2^2(t) \tag{7}$$

where $$w_1(t) = \sum_{i=1}^{i} P(i) \tag{8}$$

$$w_2(t) = \sum_{i=t+1}^{N} P(i) \tag{9}$$

$\sigma_1^2(t)$=the variance of the pixels in the background
distribution (below threshold) (10)

$\sigma_2^2(t)$=the variance of the pixels in the foreground
distribution (above threshold) (11)

The weights $w_1$ (t) and $w_2$ (t) represent the probabilities of the background and foreground distributions respectively. These probabilities are computed as the sum of the probabilities of the respective intensity levels. In turn, the individual intensity probabilities P(i) are computed as the ratio of the number of pixels bearing the specific intensity to the total number of pixels in the scene. One symbolizes the number of intensity levels by N. Since the range of intensity values per color channel is [0–255], the total number of intensity values is N=256.

In Listing 2 below, one computes the number of pixels for each specific intensity in the range [0–255]. This is the histogram of the color channel. Based on the histogram one computes the individual intensity probabilities in lines 17–18 of Listing 2. If one subtracts the within-class variance $\sigma_w^2(t)$ from the total variance $\sigma^2$ of the pixel population, one gets the between-class variance $\sigma_b^2(t)$:

$$\sigma_b^2(t) = \sigma^2(t) - \sigma_w^2(t) = w_1(\mu_1-\mu)^2 + w_2(\mu_2-\mu)^2$$

where $\mu_1$ is the mean of the background pixel distribution, $\mu_2$ is the mean of the foreground pixel distribution, and $\mu$ is the total mean. The means can be computed by the following equations:

$$\mu_1(t) = M_1(t)/w_1(t) \quad (13)$$

$$M_1(t) = \sum_{i=1}^{i} iP(i) \quad (14)$$

$$\mu_2(t) = M_2(t)/w_2(t) \quad (15)$$

$$M_2(t) = \sum_{i=t+1} iP(i) \quad (16)$$

$$\mu(t) = \sum_{i=1}^{N} iP(i) \quad (17)$$

One uses Equation (17) to compute the total mean in lines 22–23 of Listing 2. By observing carefully Equation (12), one notices that the between-class variance is simply the weighted variance of the distribution means themselves around the overall mean. One's initial optimization problem of minimizing the within-class variance $\sigma_w(t)$ can now be casted as maximizing the between-class variance $\sigma_b(t)$. One uses Equations (13)–(17) in Equation (12) to obtain $$\sigma_b^2(t) = \frac{(w_1(t)\mu(t) - M_1(t))^2}{w_1(t)(1 - w_1(t))}. \quad (18)$$

For each potential threshold value t(t $\in$[0–255]), one computes the weight (probability) of the background distribution $w_1$ and the mean enumerator $M_1$. One uses these values to compute the between-class variance for every pixel intensity t. Then, one picks as the optimal threshold value $t_{opt}$ the value that yields the maximum $\sigma_b^2$. This sounds like an extensive amount of work but fortunately it can be formulated as a recursive process. One can start from t=0 and compute incrementally $w_1$ and $M_1$ up to t=255 by using the following recursive equations:

$$w_1(+1) = w_1(t) + P(t+1) \quad (19)$$

$$M(t+1) = M(t) + (t+1)P(t). \quad (20)$$

One employs Equations (19) and (20) in lines 27–28 of Listing 2 to compute $w_1$ and $M_1$ incrementally at each step. Based on these values and the value of the total mean $\mu$ computed once in lines 21–23 of Listing 2, one calculates the between-class variance in lines 34–35 by straight application of Equation (12). One compares the current step value of the between-class variance with the maximum value found up to the previous step in line 36 of Listing 2. As a result of this comparison, one always stores away the maximum between-class variance value along with the intensity value (potential threshold value) at which it occurred (lines 38–39, Listing 2). When one exhausts the full range of the intensity values (for loop line 25 in Listing 2) the GetImageThreshold( ) function returns the intensity value that produced the maximum between-class variance (line 44 in Listing 2). This is the threshold value that separates foreground from background pixels for the particular color channel (RED, GREEN, or BLUE).

Listing 2: The GetImageThreshold function definition.

```
1:   // adaptive thresholding algorithm
2:   int CChangeFilter: :GetImageThreshold(short int color) {
3:   ...
4:   switch(color)
5:   {
6:          case RED:
7:               for (i=0; i<m_height; i++)
8:                    for (j=0; j<m_width; j++)
9:                    {
10:                         colorj = *(m_DifferenceImage + 0 + m_colors*(j*m_height + i));
11:                         hgram[colorj] += 1;
12:                    }
13:                    ...
14:  }
15:
16:  // compute the probability P for each pixel intensity value
17:  for (i=0; i<256; i++)
18:       P[= i] (hgram[i]) / ((float) (m_width*m_height));
19:
20:  // total mean value
21:  float mu = 0.0;
22:  for (i=0; i>56; i++)
23:       mu += ((float) (i+1) ) * P[i];
24:       ...
25:       for (k=i+1; k<256; k++)
26:       {
27:            w1 += P[k];
28:            MU1 += (k+1) * P[k];
```

-continued

Listing 2: The GetImageThreshold function definition.

```
29:     if ( (w1 <= 0) || (w1 >= 1))
30:     {
31:     }
32:     else
33:     {
34:         ftemp = mu * w1 - MU1;
35:         sigma_B_sq = (ftemp * ftemp) / (float) (w1 * (1.0 - w1));
36:         if ( sigma_B_sq > sigma_B_sqr_max
37:         {
38:             sigma_B_sqr_max = sigma_B_sq;
39:             k_thresh = k;
40:         }
41:     }
42: }
43:
44: return k_thresh;
45: }.
```

The segmented image goes on to a signature extraction component 319 and identification component 321. Color signature extraction is applied only to the foreground of incoming image 315 which is segmented out in segmented image 317. The removed background is replaced with a black area. A histogram is made of image 317. Each pixel has a triplet of values, one for the red, one for the green, and one for the blue component. The values range from 0 to 255 for each color. A value of zero indicates no color and 255 indicates the full color. More than one pixel of the segmented image may have the same color triplet. The segmented image 317 may be cropped or limited to a certain area 322 incorporating a foreground. The histograms for red, green, and blue constitute a color signature for image 322. A set of these three histograms constitute a color signature for the foreground or person of image 322. The background in this image generally is black.

The color signature of image 322 goes to a compare and match unit or component 324. Color signature extraction component 319 is connected to compare and match component 324. Components 319 and 324 are part of the identification component 321. The color signature of image 322 is compared with other signatures in a database 325 and matched with the ones that have a matching value of a predetermined value or greater. These other signatures are from images stored along with their signatures in database 325. The images of the signatures selected from database 325 as having a close match may be reviewed to see which image is of the same person or object in image 322 or 317. Color signature matching is good for tracking a person in a department store, an airport or other facility that has somewhat a constant type of illumination. The person may be a potential hijacker or a suspect thief. When a suspicious person comes through a gate or entrance, a picture will be taken of him or her and be processed into a color signature as described above. Then if the suspect disappears into the crowd, he or she, among many others, may be captured on another camera and the resulting image processed into a color signature. Then a compare and match may be done with the signatures to correlate the images and the identity and/or location of the suspect. The suspect's color signature may be compared and matched with one or more signatures from a large database of signatures. At least it may be possible to do a compare and match on a bank of, for example, 100 signatures and one may come up with less than a dozen matches. Then the images may be compared for positive identification. This would be much quicker than looking at 100 images. The color signatures may be done on the whole body or just a portion of it such as below the belt, the middle just between the belt and neck, or just the face.

Figure 17A:
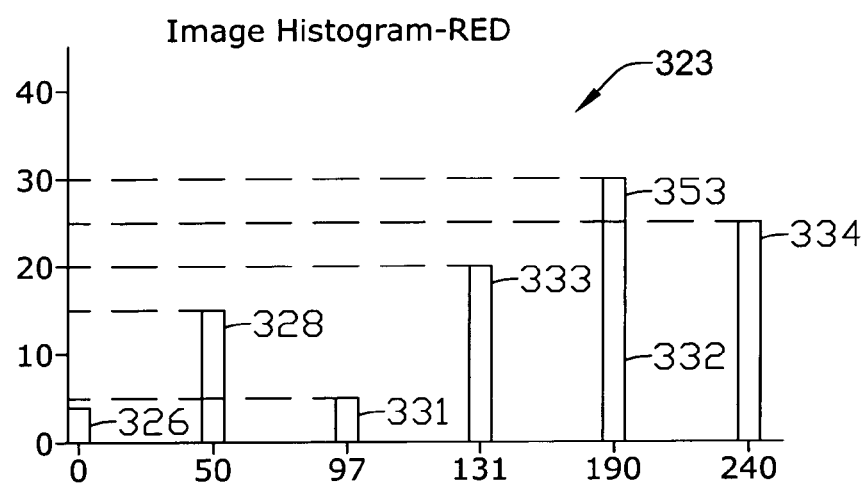
FIG. 17a and 17b reveal image and model histograms.

FIG. 17a shows an illustrative histogram 323 of image 322 for the red color channel. There may be similar histograms for the colors green and blue of image 322. For the color red as noted in FIG. 17a, there are 4 pixels with the color value of zero, 16 with the value of 50, 5 with the value of 97, 20 with the value of 131, 30 with the value of 190 and 25 with the value of 240. The total number of pixels with assigned color values adds up to 100, the same number of pixels in image 322. The number of pixels associated with a particular color value is a bin. For instance, 30 pixels having a color value 190 is a bin 353.

Figure 17B:
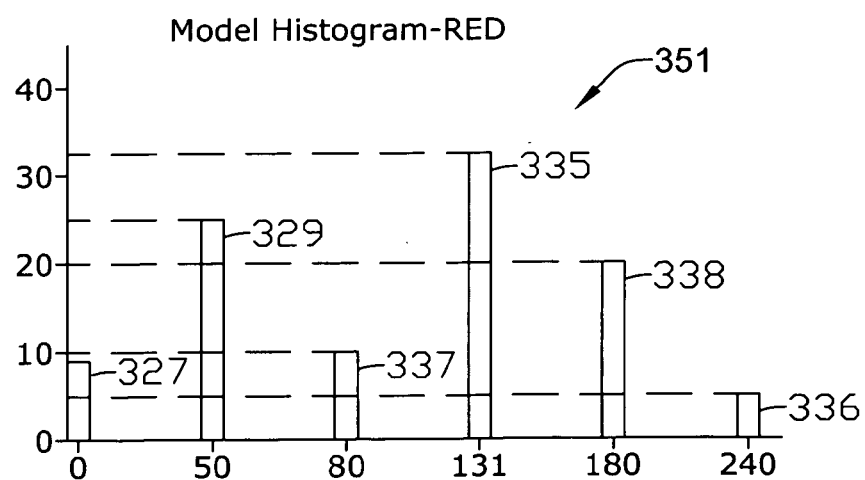

FIG. 17b shows a reference or model histogram 351 of a signature to which histogram 323 is compared and matched for determining the degree of similarity match ($M^R$) for red. For the same color values of both histograms, the intersection ($I_1$), i.e., the smaller number, of bins 326 and 327 for color value zero is 4 pixels. The intersection ($I_2$) for bins 328 and 329 for color value 50 is 16. There are no corresponding bins in histogram 351 for bins 331 and 332, corresponding to values 97 and 190; so the intersections for these bins are at zero pixels. For color values 131 and 240, bins 333 and 334 intersect with bins 335 and 336 for intersection values ($I_3, I_4$) 20 and 5 pixels, respectively. There is no color value in image histogram 323 that corresponds to bins 337 and 338 of model histogram 351.

To obtain a normalized value of the red match ($M^R$), one adds up the intersection numbers of pixels and divides them by the total number ($T_p$) of incoming image pixels.

$$M^R = \frac{I_1 + I_2 + I_3 + I_4}{T_p} = \frac{4 + 16 + 20 + 5}{100} = 0.45.$$

The same approach for the green and blue histograms of the incoming image and the model is used. Then the normalized values ($M^R, M^G, M^B$) may be added to obtain the total value of the match of the incoming image color signature with the model color signature.

The color signatures and corresponding images 341 in database 325 are distributed to all of the computers and/or operators of group 342 in the CCN system. Display and console 343 provide the operator a user interface with the CCN system to take pictures with camera 311, compare and match color signatures, observe images and so forth.

Figure 18:
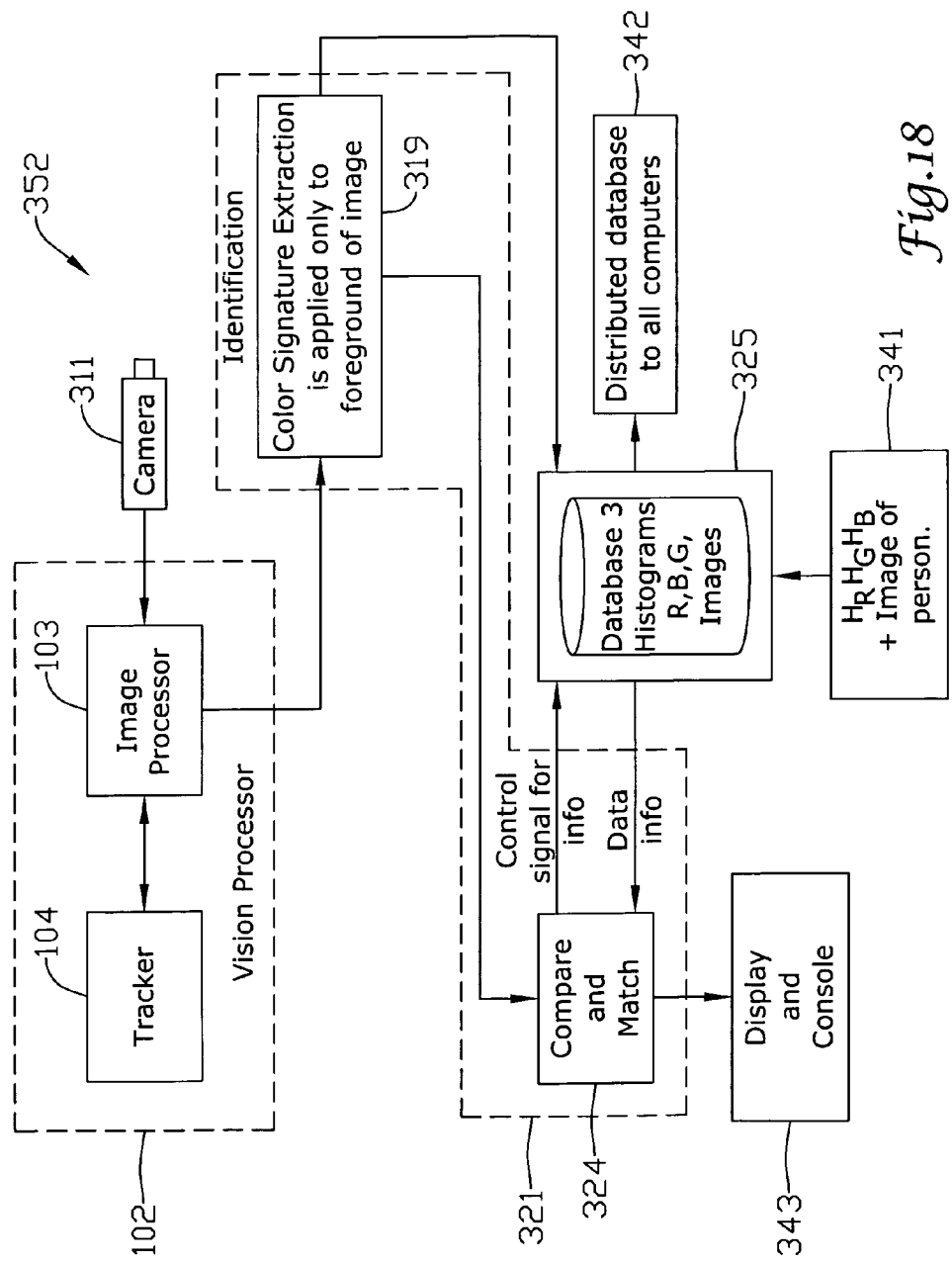
FIG. 18 is a block diagram of the cooperative camera network incorporating vision processing in lieu of the initialization, differencing and thresholding components.

Vision processor 102, with tracker 104 and image processor 103 (disclosed above), can replace initialization component 312, differencing component 313 and thresholding component 318 of system 350 in FIG. 15 to result in a CCN system 352 in FIG. 18. Vision processor 120 distinguishes foreground from background with motion. If an object stops moving, then it automatically becomes part of the background. CCN system 352 is more resilient to change of lighting than the system 350. System 352 works better in places without stagnant illumination or places with changing illumination.

Figure 19:
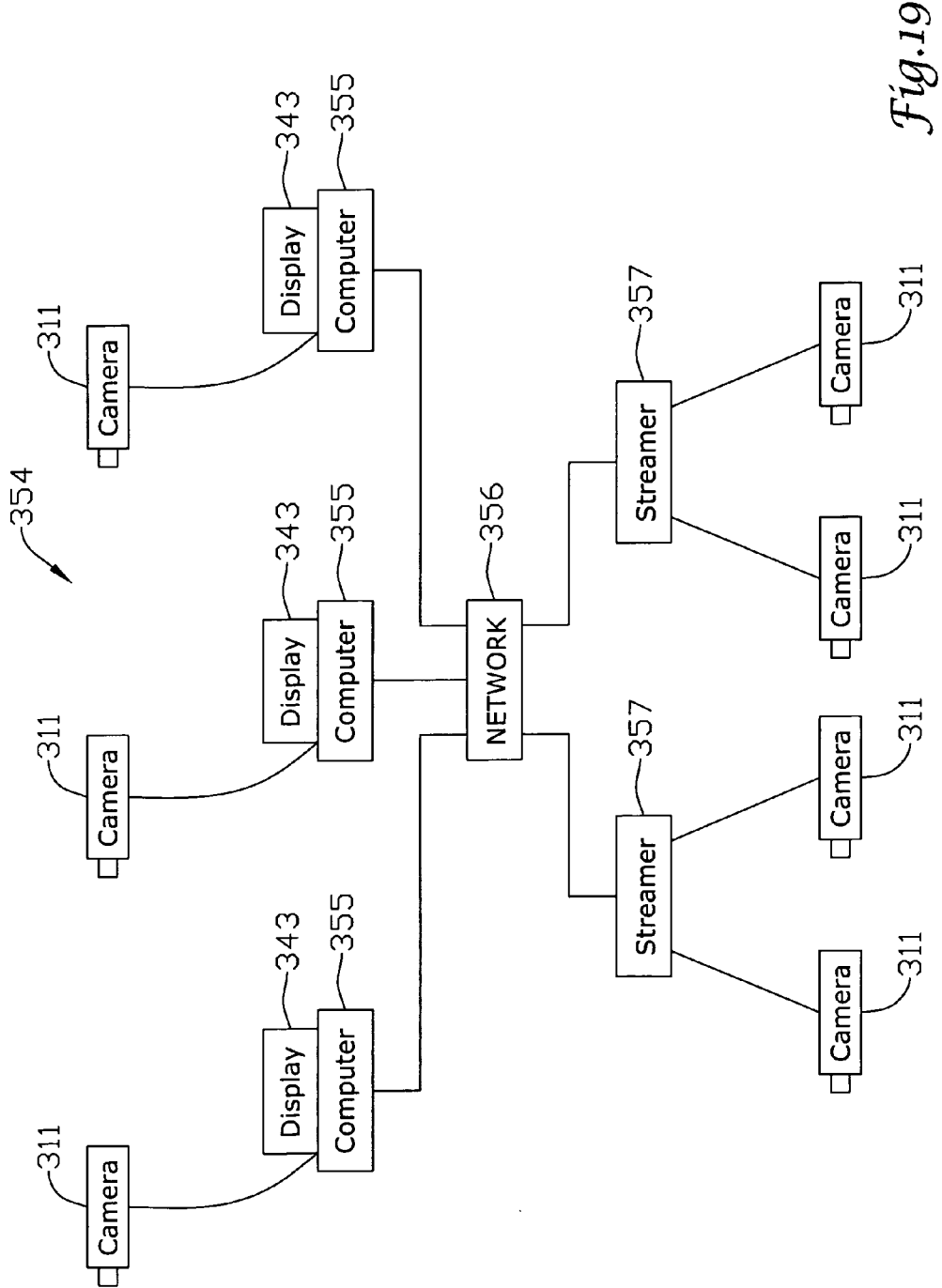
FIG. 19 is a diagram revealing certain hardware components used in the invention.

FIG. 19 is a diagram of a hardware system layout 354. The user via a display and console 343 and a camera 311 are the two inputs to system 354. Each camera 311 uses an expanded serial bus USB1394 or some other means for interfacing with the system. Camera 311 can pass video information as digitized and compressed data that is pushed through to network 356 as digitized streams via a streamer 357. Each streamer may take in four plus streams of camera data. However, the more streams, the less frames of video per second. A combination of direct or streamer configurations may be utilized. Computer 355 can provide the processing of the steps of systems 350 and 352. The processing, data and/or storage may be distributed to other camera and computer stations.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A cooperative camera network station comprising:
   at least one camera;
   an initialization component connected to said at least one camera;
   a differencing component connected to said at least one camera; and
   a color signature extraction component connected to said differencing component.

2. The cooperative camera network of claim 1, further comprising a thresholding component connected to said differencing component.

3. The network of claim 2, further comprising:
   a database component connected to said color signature extraction component; and
   a color signature matching component connected to said database component.

4. The network of claim 2, further comprising:
   a display function connected to said color signature matching component; and
   a distributed database component connected to said database component.

5. A method for identifying an object comprising:
   obtaining a first image of a scene;
   obtaining a second image of the scene;
   differencing the first and second images into a segmented image having substantially dissimilar regions of the first and second images retained;
   thresholding regions that have a set threshold level of dissimilarity and adding them to the segmented image; and
   extracting a color signature from the segmented image; and
   matching the color signature with a color signature in a database.

6. The method of claim 5, wherein said extracting the color signature comprises attaining a histogram of the segmented image.

7. The method of clam 6, wherein the histogram comprises the number of pixels in the segmented image for each color value of a range of color values for a first color.

8. The method of claim 7, further comprising matching the histogram with a histogram of the color signature in the database.

9. A method for identifying an object comprising:
   obtaining a first image of a scene;
   obtaining a second image of the scene;
   differencing the first and second images into a segmented image having substantially dissimilar regions of the first and second images retained;
   thresholding regions that have a set threshold level of dissimilarity and adding them to the segmented image; and
   extracting a color signature from the segmented image by attaining a histogram of the segmented image, wherein the histogram comprises the number of pixels in the segmented image for each color value of a range of color values for a first color;
   matching the color signature with a color signature in a database; and
   matching the histogram with a histogram of the color signature in the database by
      selecting color values that have pixels in both histograms;
      noting the smaller number of pixels of the two numbers for each selected color value;
      adding the smaller numbers of pixels of all of the selected color values to a first sum;
      adding up the numbers of pixels for all of the color values of the histogram of the segmented image to a second sum;
      dividing the first sum by the second sum to attain a value of a match of the color signature in the database with the color signature of the segmented image, for the first color.

10. The method of claim 9, further comprising repeating the method of claims 8 and 9 for any other color signature in the database.

11. The method of claim 9, further comprising repeating the method of claim 9 for a second color.

12. The method of claim 11, further comprising repeating the method of claim 9 for a third color.

13. An identification system comprising:
   means for imaging;
   means for initializing connected to said means for imaging;
   means for storing data connected to said means for imaging;
   means for segmenting connected to said means for storing data; and
   means for identifying connected to said means for storing data, wherein said means for identifying comprises:
      means for determining a color signature of an image; and
      means for comparing the color signature with at least another color signature.

14. The identification system of claim 13, wherein said means for identifying further comprises means for selecting color signatures from said means for storing data that match to a selected level the color signature of the image.

15. The identification system of claim 14, wherein said means for determining a color signature measures a color value of each pixel of the image for one color.

16. The identification system of claim 15, wherein said means for determining a color signature measures a color value of each pixel of the image for each of three colors.

* * * * *